(12) United States Patent
Iwamoto et al.

(10) Patent No.: US 11,826,988 B2
(45) Date of Patent: Nov. 28, 2023

(54) INTERLAYER FILM FOR LAMINATED GLASS, AND LAMINATED GLASS

(71) Applicant: SEKISUI CHEMICAL CO., LTD., Osaka (JP)

(72) Inventors: Tatsuya Iwamoto, Kouka (JP); Daizou Ii, Kouka (JP); Yuji Uchimura, Kouka (JP); Nami Minakuchi, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 61 days.

(21) Appl. No.: 17/172,780

(22) Filed: Feb. 10, 2021

(65) Prior Publication Data

US 2021/0162715 A1 Jun. 3, 2021

Related U.S. Application Data

(63) Continuation of application No. 15/102,503, filed as application No. PCT/JP2015/050977 on Jan. 15, 2015, now Pat. No. 10,946,620.

(30) Foreign Application Priority Data

Jan. 15, 2014 (JP) .................................. 2014-005485

(51) Int. Cl.
*B32B 17/10* (2006.01)
*B32B 27/08* (2006.01)
(Continued)

(52) U.S. Cl.
CPC ........ *B32B 17/10678* (2013.01); *B32B 7/022* (2019.01); *B32B 7/027* (2019.01);
(Continued)

(58) Field of Classification Search
CPC ....... B32B 17/10; B32B 27/22; B32B 27/306; B32B 17/10761
(Continued)

(56) References Cited

U.S. PATENT DOCUMENTS

| 4,452,935 A | 6/1984 | Nomura et al. |
| 2006/0008658 A1 | 1/2006 | Fukatani et al. |

(Continued)

FOREIGN PATENT DOCUMENTS

| CN | 103003218 A | 3/2013 |
| CN | 103140451 A | 6/2013 |

(Continued)

OTHER PUBLICATIONS

International Search Report for the Application No. PCT/JP2015/050977 dated Mar. 31, 2015.
(Continued)

*Primary Examiner* — Tahseen Khan
(74) *Attorney, Agent, or Firm* — Cheng Law Group, PLLC

(57) ABSTRACT

There is provided an inter layer film for laminated glass with which the flexural rigidity of laminated glass can be enhanced. The interlayer film for laminated glass according to the present invention has a one-layer structure or a two or more-layer structure and is provided with a first layer containing a polyvinyl acetal resin and a plasticizer, and the half-value width of the hydroxyl group of the polyvinyl acetal resin contained in the first layer is less than or equal to 250 $cm^{-1}$ and the content of the plasticizer contained in the first layer relative to 100 parts by weight of the polyvinyl acetal resin contained in the first layer is greater than or equal to 5 parts by weight and less than 30 parts by weight, or the half-value width of the hydroxyl group of the polyvinyl acetal resin contained in the first layer is greater than 250 $cm^{-1}$.

19 Claims, 3 Drawing Sheets

(51) Int. Cl.
   *B32B 27/22*   (2006.01)
   *B32B 27/30*   (2006.01)
   *B32B 7/04*    (2019.01)
   *B32B 7/12*    (2006.01)
   *B32B 27/28*   (2006.01)
   *B32B 7/027*   (2019.01)
   *B32B 7/022*   (2019.01)

(52) U.S. Cl.
   CPC ............. *B32B 7/04* (2013.01); *B32B 7/12* (2013.01); *B32B 17/10* (2013.01); *B32B 17/10036* (2013.01); *B32B 17/10761* (2013.01); *B32B 27/08* (2013.01); *B32B 27/22* (2013.01); *B32B 27/28* (2013.01); *B32B 27/306* (2013.01); *B32B 2250/40* (2013.01); *B32B 2307/102* (2013.01); *B32B 2307/40* (2013.01); *B32B 2307/412* (2013.01); *B32B 2307/546* (2013.01); *B32B 2307/558* (2013.01); *B32B 2419/00* (2013.01); *B32B 2551/00* (2013.01); *B32B 2605/00* (2013.01)

(58) Field of Classification Search
   USPC ........................................................ 428/215
   See application file for complete search history.

(56) References Cited

U.S. PATENT DOCUMENTS

| | | | |
|---|---|---|---|
| 2008/0268270 A1* | 10/2008 | Chen ................. | B32B 17/10761 525/191 |
| 2008/0280116 A1* | 11/2008 | Fukatani ........... | B32B 17/10697 428/212 |
| 2009/0294212 A1 | 12/2009 | Miyai | |
| 2010/0209716 A1 | 8/2010 | Fukatani et al. | |
| 2011/0094825 A1 | 4/2011 | Miyai | |
| 2012/0003428 A1 | 1/2012 | Miyai | |
| 2013/0149503 A1* | 6/2013 | Yamamoto ........ | B32B 17/10036 428/156 |
| 2013/0157065 A1 | 6/2013 | Shimamoto et al. | |
| 2013/0183532 A1 | 7/2013 | Shimamoto et al. | |
| 2013/0236711 A1* | 9/2013 | Lu .................... | B32B 17/10036 428/213 |
| 2013/0288061 A1 | 10/2013 | Kitano et al. | |
| 2013/0337247 A1* | 12/2013 | Kitano .............. | B32B 17/10761 428/432 |
| 2014/0014178 A1 | 1/2014 | Muguruma | |
| 2014/0178651 A1 | 6/2014 | Miyai | |
| 2014/0227537 A1 | 8/2014 | Shimamoto et al. | |
| 2014/0315028 A1 | 10/2014 | Shimamoto et al. | |
| 2014/0377567 A1 | 12/2014 | Ii et al. | |
| 2015/0258747 A1 | 9/2015 | Miyai | |
| 2016/0341960 A1 | 11/2016 | Miyai | |
| 2018/0037711 A1 | 2/2018 | Kitano et al. | |

FOREIGN PATENT DOCUMENTS

| | | |
|---|---|---|
| CN | 103261113 A | 8/2013 |
| EP | 0 067 022 A1 | 12/1982 |
| EP | 0 710 545 A1 | 5/1996 |
| EP | 2 612 843 A1 | 7/2013 |
| EP | 3 000 600 A1 | 3/2016 |
| JP | 56-92142 A | 7/1981 |
| JP | 57-200250 A | 12/1982 |
| JP | 58-32044 A | 2/1983 |
| JP | 3-124441 A | 5/1991 |
| JP | 6-115980 A | 4/1994 |
| JP | 8-48547 A | 2/1996 |
| JP | 10-139500 A | 5/1998 |
| JP | 2004-99334 A | 4/2004 |
| JP | 2004-143008 A | 5/2004 |
| JP | 2005-206445 A | 8/2005 |
| JP | 2005-219726 A | 8/2005 |
| JP | 2007-70200 A | 3/2007 |
| JP | 2008-303139 A | 12/2008 |
| JP | 2009-45874 A | 3/2009 |
| JP | 2013-1613 A | 1/2013 |
| JP | 2013-6726 A | 1/2013 |
| JP | 2013-6729 A | 1/2013 |
| JP | 5373232 B1 | 12/2013 |
| JP | 2015-516934 A | 6/2015 |
| JP | 2015-525192 A | 9/2015 |
| RU | 2 432 331 C2 | 10/2011 |
| WO | WO-2012/026393 A1 | 3/2012 |
| WO | WO-2012/029916 A1 | 3/2012 |
| WO | WO-2012/043819 A1 | 4/2012 |
| WO | WO-2013/118890 A1 | 8/2013 |
| WO | WO-2013/134599 A1 | 9/2013 |
| WO | WO-2013/181484 A1 | 12/2013 |

OTHER PUBLICATIONS

International Preliminary Report on Patentability (PCT/IPEA/409) for Application No. PCT/JP2015/050977 dated Mar. 11, 2016 (English Translation dated Jul. 21, 2016).
Supplementary European Search Report for the Application No. EP 15 737 760.7 dated Aug. 22, 2017.
Extended European Search Report for the Application No. EP 19 165 106.6 dated Jul. 12, 2019.
Japanese Written Opposition Notice for the Application No. 2016-700315 dated May 16, 2016.
Notification of Reasons for Refusal for the Application No. 2015-103080 from Japan Patent Office dated May 15, 2018.
Japanese Office Action for the Application No. 2019-019873 dated Jul. 14, 2020.
The First Office Action for the Application No. 201580002236.1 from The State Intellectual Property Office of the People's Republic of China dated Jun. 4, 2018.
Russian Office Action for Application No. 2016133167/03(051336) dated Jun. 18, 2018.
Indian Office Action for the Application No. 201637020191 dated Jun. 27, 2019.

\* cited by examiner

[FIG. 1]
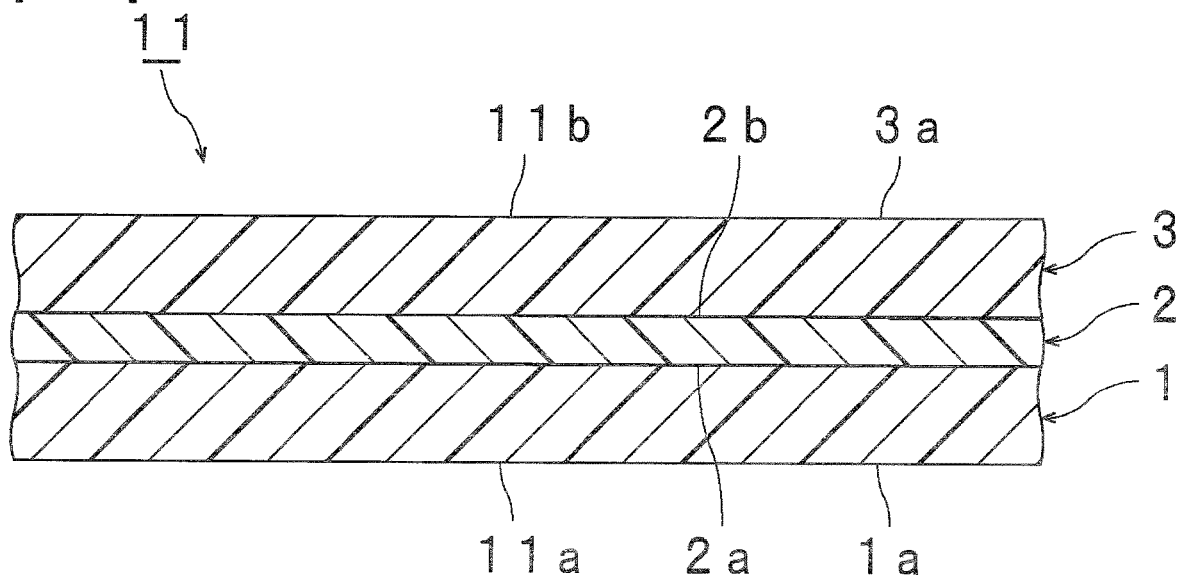
[FIG. 2]
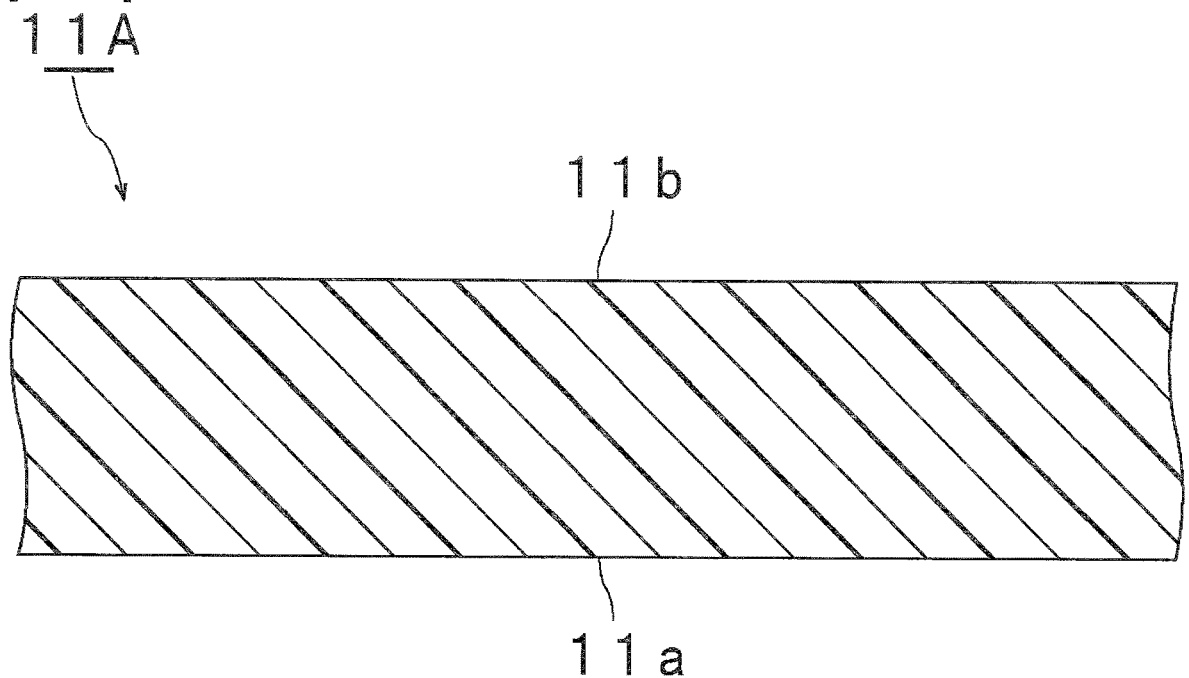

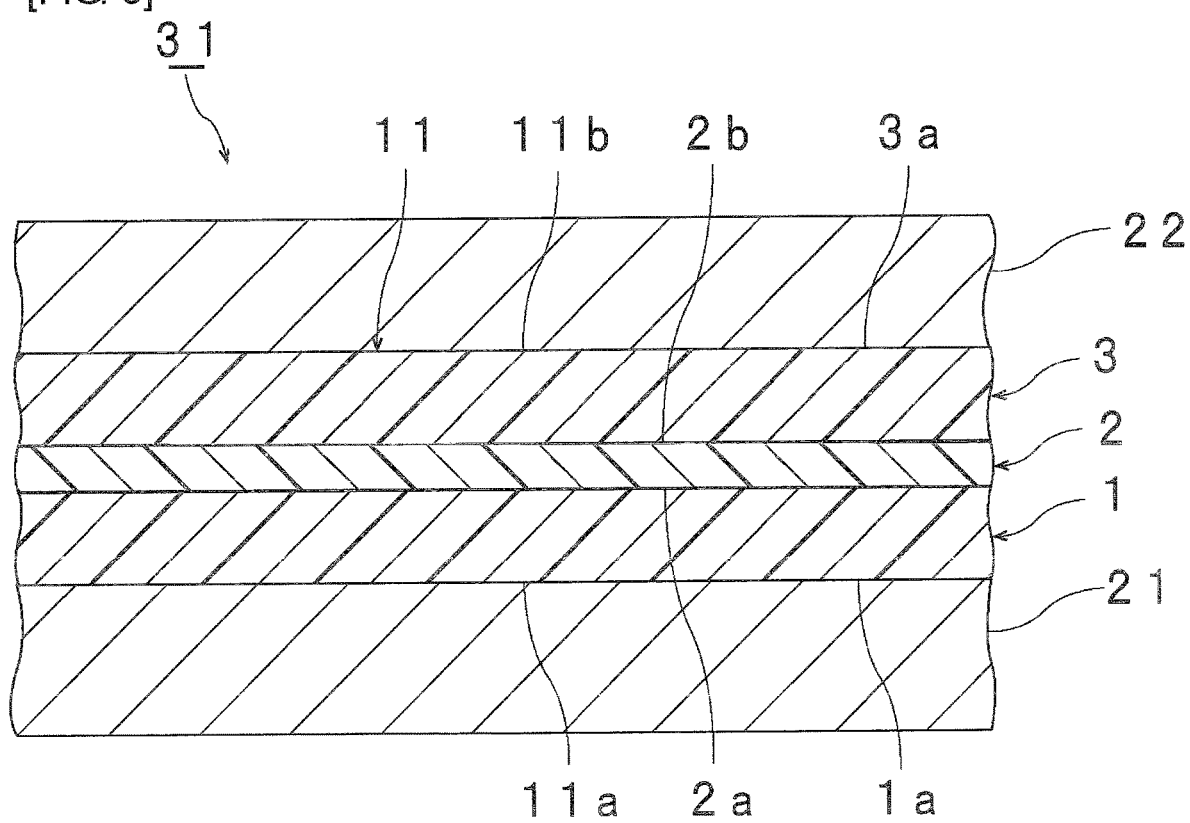
[FIG. 3]

[FIG. 4]
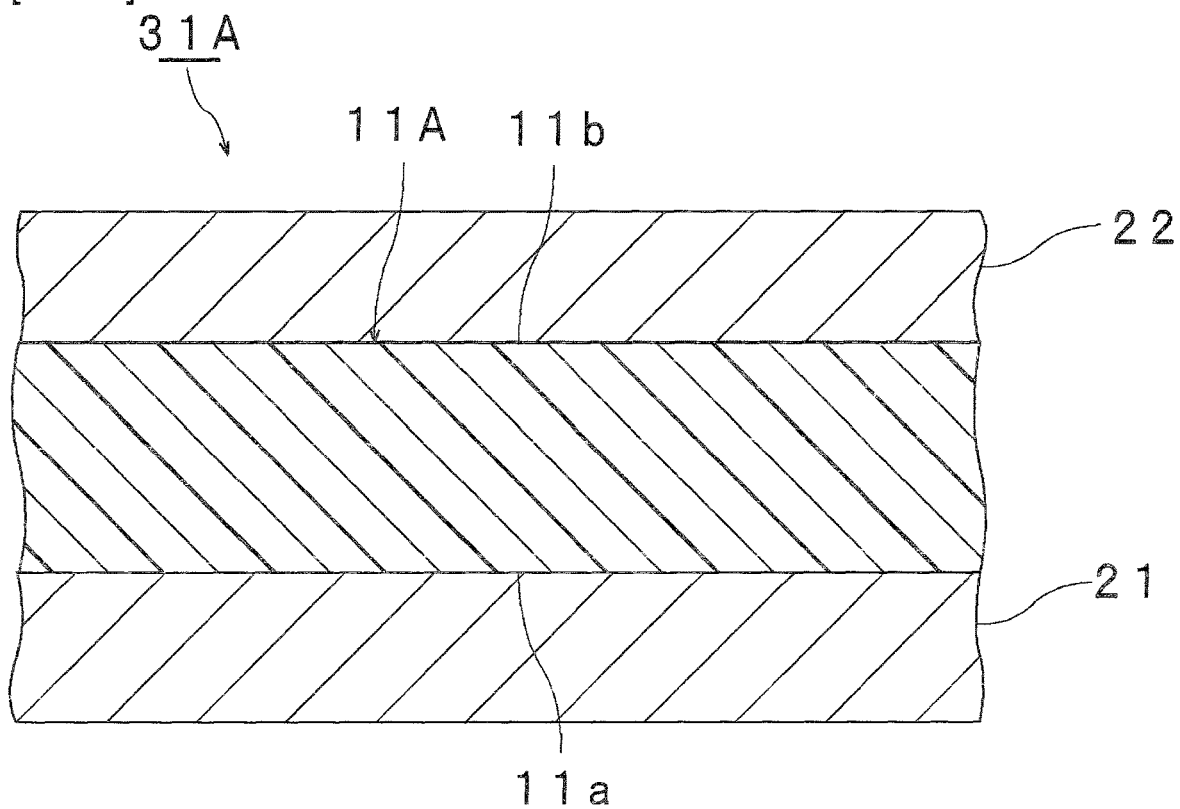
[FIG. 5]
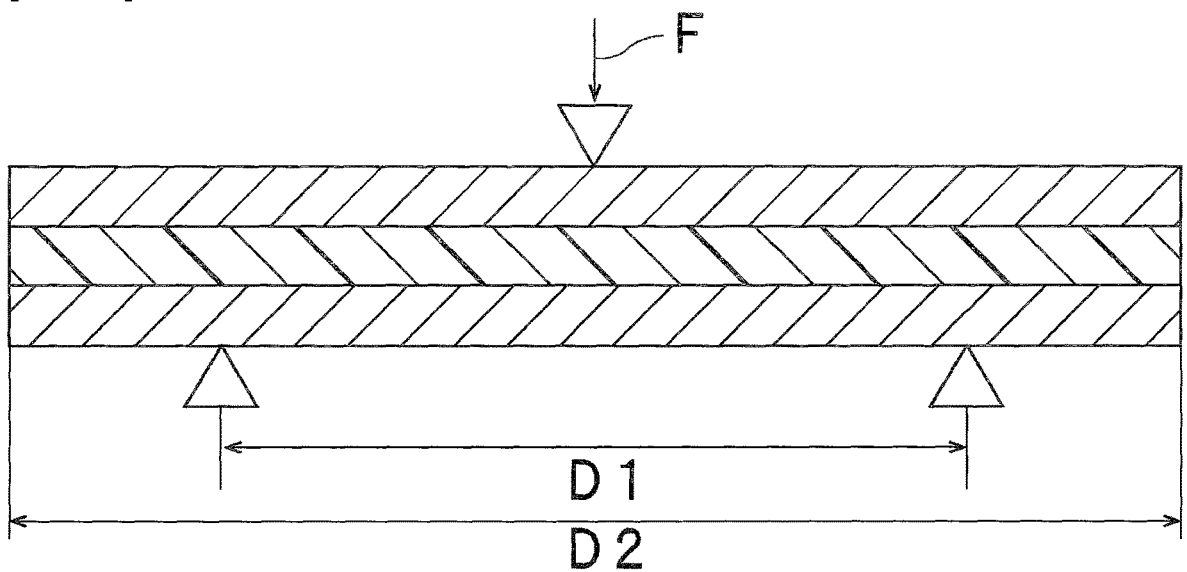

INTERLAYER FILM FOR LAMINATED GLASS, AND LAMINATED GLASS

CROSS-REFERENCE TO RELATED APPLICATIONS

This application is a Continuation Application of Patent Application Ser. No. 15/102,503, filed on Jun. 7, 2016, which is a 371 application of Application Serial No. PCT/JP2015/050977, filed on Jan. 15, 2015, which is based on Japanese Patent Application No. 2014-005485, filed on Jan. 15, 2014, the entire contents of which are hereby incorporated by reference.

TECHNICAL FIELD

The present invention relates to an interlayer film for laminated glass used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount less than or equal to 30 parts by weight.

The following Patent Document 2 discloses an interlayer film which is a polymer layer having a glass transition temperature higher than or equal to 33° C. In Patent Document 2, a technique of allowing the polymer layer to be arranged between glass plates with a thickness less than or equal to 4.0 mm is described.

RELATED ART DOCUMENT

Patent Document

Patent Document 1: JP 2007-070200 A
Patent Document 2: US 2013/0236711 A1

SUMMARY OF THE INVENTION

Problems to be Solved by the Invention

In laminated glass prepared with such a conventional interlayer film described in Patent Documents 1 and 2, there are cases where the laminated glass is low in flexural rigidity. As such, for example, in the case where laminated glass is used for a side door of an automobile, the laminated glass with no fixing frame sometimes causes troubles in allowing the glass to be opened/shut due to the deflection attributed to the low rigidity of the laminated glass.

Moreover, in recent years, for the purpose of attaining reduced weight of laminated glass, a technique for allowing a glass plate to be thinned in thickness has been desired. In laminated glass prepared with an interlayer film sandwiched between two glass plates, when the thickness of the glass plate is thinned, there is a problem that maintaining the flexural rigidity sufficiently high is extremely difficult.

For example, laminated glass can be reduced in weight as long as the flexural rigidity of laminated glass can be enhanced by virtue of the interlayer film even when the thickness of the glass plate is thinned. When laminated glass is light in weight, the amount of the material used for the laminated glass can be decreased and the environmental load can be reduced. Furthermore, when laminated glass being light in weight is used for an automobile, the fuel consumption can be improved, and as a result, the environmental load can be reduced.

An object of the present invention is to provide an interlayer film for laminated glass with which the flexural rigidity of laminated glass can be enhanced. Moreover, the present invention is also aimed at providing laminated glass prepared with the interlayer film for laminated glass.

Means for Solving the Problems

According to a broad aspect of the present invention, there is provided an interlayer film for laminated glass having a one-layer structure or a two or more-layer structure and being provided with a first layer containing a polyvinyl acetal resin and a plasticizer, the half-value width of the hydroxyl group of the polyvinyl acetal resin contained in the first layer being less than or equal to 250 $cm^{-1}$ and the content of the plasticizer contained in the first layer relative to 100 parts by weight, of the polyvinyl acetal resin contained in the first layer being greater than or equal to 5 parts by weight and less than 30 parts by weight, or the half-value width of the hydroxyl group of the polyvinyl acetal resin contained in the first layer being greater than 250 $cm^{-1}$.

In a specific aspect of the interlayer film for laminated glass according to the present invention, the interlayer film is provided with the first layer as a surface layer of the interlayer film.

In a specific aspect of the interlayer film for laminated glass according to the present invention, the interlayer film is an interlayer film for laminated glass having a two or more-layer structure and being further provided with a second layer containing a polyvinyl acetal resin and a plasticizer, wherein the first layer is arranged on a first surface side of the second layer.

In a specific aspect of the interlayer film for laminated glass according to the present invention, the interlayer film is an interlayer film for laminated glass having a three or more-layer structure and being further provided with a third layer containing a polyvinyl acetal resin and a plasticizer, wherein the half-value width of the hydroxyl, group of the polyvinyl acetal resin contained in the third layer is less than or equal to 250 cm$^{-1}$ and the content of the plasticizer contained in the third layer relative to 100 parts by weight, of the polyvinyl acetal resin contained in the third layer is greater than or equal to 5 parts by weight and less than 30 parts by weight, or the half-value width of the hydroxyl group of the polyvinyl acetal resin contained in the third layer is greater than 250 cm$^{-1}$, and the third layer is arranged on a second surface side opposite to the first surface side of the second layer.

In a specific aspect, of the interlayer film for laminated glass according to the present invention, the interlayer film is provided with the third layer as a surface layer of the interlayer film.

In a specific aspect of the in ter layer film for laminated glass according to the present invention, the content of the plasticizer contained in the second layer is greater than or equal to 55 parts by weight relative to 100 parts by weight of the polyvinyl acetal resin contained in the second layer.

In a specific aspect of the interlayer film for laminated glass according to the present invention, the thickness of the second layer is greater than or equal to 0.0625T and less than or equal to 0.375T when the thickness of the inter layer film for laminated glass is defined as T.

In a specific aspect of the interlayer film for laminated glass according to the present invention, the half-value width of the hydroxyl group of the polyvinyl acetal resin contained in the first layer is greater than 250 cm$^{-1}$.

In a specific aspect of the interlayer film for laminated glass according to the present invention, the half-value width of the hydroxyl group of the polyvinyl acetal resin contained in the first layer is less than or equal to 250 cm$^{-1}$ and the content of the plasticizer contained in the first layer relative to 100 parts by weight of the polyvinyl acetal resin contained in the first layer is greater than or equal to 5 parts by weight and less than 30 parts by weight.

In a specific aspect of the interlayer film for laminated glass according to the present invention, the interlayer film is used with a first glass plate with a thickness less than or equal to 1 mm and arranged between the first glass plate and a second glass plate to be used for obtaining laminated glass.

In a specific aspect of the interlayer film for laminated glass according to the present invention, the interlayer film is used with a first glass plate with a thickness less than or equal to 1 mm and a second glass plate with a thickness less than or equal to 1 mm and arranged between the first glass plate and the second glass plate to be used for obtaining laminated glass.

According to a broad aspect of the present invention, there is provided laminated glass including a first glass plate, a second glass plate, and the interlayer film for laminated glass described above, wherein the interlayer film for laminated glass is arranged between the first glass plate and the second glass plate.

In a specific aspect of the laminated glass according to the present invention, the thickness of the first glass plate is less than or equal to 1 mm.

In a specific aspect of the laminated glass according to the present invention, the thickness of the second glass plate is less than or equal to 1 mm.

Effect of the Invention

Since the interlayer film for laminated glass according to the present invention has a one-layer structure or a two or more-layer structure and is provided with a first layer containing a polyvinyl acetal resin and a plasticizer, the half-value width of the hydroxyl group of the polyvinyl acetal resin contained in the first layer is less than or equal to 250 cm$^{-1}$ and the content of the plasticizer contained in the first layer relative to 100 parts by weight of the polyvinyl acetal resin contained in the first layer is greater than or equal to 5 parts by weight and less than 30 parts by weight, or the half-value width of the hydroxyl group of the polyvinyl acetal resin contained in the first layer is greater than 250 cm$^{-1}$, it is possible to enhance the flexural rigidity of laminated glass prepared with the interlayer film.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIG. 5 is a schematic view for illustrating a measurement method for the flexural rigidity.

MODE(S) FOR CARRYING OUT THE INVENTION

Hereinafter, the present invention will be described in detail.

The interlayer film for laminated glass (in the present specification, sometimes abbreviated as "the interlayer film") according to the present invention has a one-layer structure or a two or more-layer structure. The interlayer film according to the present invention may have a one-layer structure and may have a two or more-layer structure. The interlayer film according to the present invention is provided with a first layer containing a polyvinyl acetal resin and a plasticizer. The interlayer film according to the present invention may be a single-layered interlayer film provided with only the first layer and may be a multi-layered interlayer film provided with the first layer and another layer.

In the interlayer film according to the present invention, the half-value width of the hydroxyl group of the polyvinyl acetal resin contained in the first layer is less than or equal to 250 cm$^{-1}$ and the content of the plasticizer contained in the first layer relative to 100 parts by weight of the polyvinyl acetal resin contained in the first, layer is greater than or equal to 5 parts by weight and less than 30 parts by weight (constitution (1)), or the half-value width of the hydroxyl group of the polyvinyl acetal resin contained in the first layer is greater than 250 cm$^{-1}$ (constitution (2)). With regard to the first layer, it is preferred that the interlayer film according to the present invention have the above-mentioned constitution (1), and it is also preferred that the interlayer film according to the present invention have the above-mentioned constitution (2). Of these, the above-mentioned constitution (2) is more preferred.

Since the interlayer film according to the present invention has the foregoing configuration, it is possible to enhance the flexural rigidity of laminated glass prepared with the interlayer film. Moreover, for obtaining laminated glass, the interlayer film is arranged between a first glass plate and a second glass plate. Even when the thickness of a first glass plate is thinned, by the use of the inter layer film according to the present invention, it is possible to sufficiently enhance the flexural rigidity of laminated glass. Moreover, even when the thicknesses of both a first glass plate and a second glass plate are thinned, by the use of the inter layer film according to the present invention, it is possible to sufficiently enhance the flexural rigidity of laminated glass.

The inter layer film may have a two or more-layer structure and may be provided with a second layer in addition to a first layer. It is preferred that the interlayer film be further provided with a second layer containing a polyvinyl acetal resin and a plasticizer. In the case where the interlayer film is provided with the second layer, the first layer is arranged on a first surface side of the second layer.

In the case where the interlayer film is not provided with a third layer described below or in the case where the interlayer film has a two-layer structure composed of a first layer and a second layer, with regard to the second layer, it is preferred that the half-value width of the hydroxyl group of the polyvinyl acetal resin contained in the second layer be less than or equal to 250 cm–1 and the content of the plasticizer contained in the second layer relative to 100 parts by weight of the polyvinyl acetal resin contained in the second layer be greater than or equal to 5 parts by weight and less than 30 parts by weight (constitution (1')), or the half-value width of the hydroxyl group of the polyvinyl acetal resin contained in the second layer be greater than 250 $cm^{-1}$ (constitution (2')). With regard to the second layer, it is preferred that the interlayer film have the above-mentioned constitution (1'), and it is also preferred that the interlayer film have the above-mentioned constitution (2'). In particular, in the case where the interlayer film is provided with a third layer described below, with regard to the second layer, the interlayer film may not have the above-mentioned constitution (1') and may not have the above-mentioned constitution (2').

The interlayer film may have a three or more-layer structure and may be provided with a third layer in addition to a first layer and a second layer. It is preferred that the interlayer film be further provided with a third layer containing a polyvinyl acetal resin and a plasticizer. In the case where the inter layer film is provided with the second layer and the third layer, the third layer is arranged on a second surface side opposite to the first surface side of the second layer.

With regard to the third layer, it is preferred that the half-value width of the hydroxyl group of the polyvinyl acetal resin contained in the third layer be less than or equal to 250 $cm^{-1}$ and the content of the plasticizer contained in the third layer relative to 100 parts by weight of the polyvinyl acetal resin contained in the third layer be greater than or equal to 5 parts by weight and less than 30 parts by weight (constitution (1'')), or the half-value width of the hydroxyl group of the polyvinyl acetal resin contained in the third layer be greater than 250 $cm^{-1}$ (constitution (2'')). With regard to the third layer, it is preferred that the interlayer film have the above-mentioned constitution (1''), and it is also preferred that the inter layer film have the above-mentioned constitution (2'').

From the viewpoint of further enhancing the flexural rigidity of laminated glass, it is preferred that the interlayer film be provided with the first layer as a surface layer of the interlayer film. The interlayer film may be provided with the second layer as a surface layer of the interlayer film. From the viewpoint of further enhancing the flexural rigidity of laminated glass, it is preferred that the interlayer film be provided with the third layer as a surface layer of the interlayer film. It is preferred that the interlayer film be provided with each of the first layer and the third layer as a surface layer of the interlayer film.

It is preferred that a surface at a side opposite to the second layer side of the first layer be a surface on which a glass plate is layered. It is preferred that the thickness of a glass plate layered on the first layer be less than or equal to 1 mm. A surface at a side opposite to the first layer side (second surface) of the second layer may be a surface on which a glass plate is layered. It is preferred that the thickness of a glass plate layered on the second layer be less than or equal to 1 mm. It is preferred that a surface at a side opposite to the second layer side of the third layer be a surface on which a glass plate is layered. It is preferred that the thickness of a glass plate layered on the third layer be less than or equal to 1 mm.

From the viewpoint of further enhancing the flexural rigidity of laminated glass, in the constitution (1), the half-value width of the hydroxyl group of the polyvinyl acetal resin contained in the first layer is preferably greater than or equal to 160 $cm^{-1}$, more preferably greater than or equal to 180 $cm^{-1}$, still more preferably greater than or equal to 200 $cm^{-1}$, further preferably greater than or equal to 220 $cm^{-1}$ and still further preferably greater than or equal to 240 $cm^{-1}$.

From the viewpoint of further enhancing the flexural rigidity of laminated glass, in the constitution (2), the half-value width of the hydroxyl group of the polyvinyl acetal resin contained in the first layer is preferably greater than or equal to 251 $cm^{-1}$, more preferably greater than or equal to 255 $cm^{-1}$ and further preferably greater than or equal to 270 $cm^{-1}$. The upper limit of the half-value width of the hydroxyl group of the polyvinyl acetal resin contained in the first layer is not particularly limited. The half-value width of the hydroxyl group of the polyvinyl acetal resin contained in the first layer may be less than or equal to 300 $cm^{-1}$.

From the viewpoint of further enhancing the flexural rigidity of laminated glass, in the constitution (1'), the half-value width of the hydroxyl group of the polyvinyl acetal resin contained in the second layer is preferably greater than or equal to 160 $cm^{-1}$, more preferably greater than or equal to 180 $cm^{-1}$, still more preferably greater than or equal to 200 $cm^{-1}$, further preferably greater than or equal to 220 $cm^{-1}$ and still further preferably greater than or equal to 240 $cm^{-1}$.

From the viewpoint of further enhancing the flexural rigidity of laminated glass, in the constitution (2'), the half-value width of the hydroxyl group of the polyvinyl acetal resin contained in the second layer is preferably greater than or equal to 251 $cm^{-1}$, more preferably greater than or equal to 255 $cm^{-1}$ and further preferably greater than or equal to 270 $cm^{-1}$. The upper limit of the half-value width of the hydroxyl group of the polyvinyl acetal resin contained in the second layer is not particularly limited. The half-value width of the hydroxyl group of the polyvinyl acetal resin contained in the second layer may be less than or equal to 300 $cm^{-1}$.

From the viewpoint of further enhancing the flexural rigidity of laminated glass, in the constitution (1''), the half-value width of the hydroxyl group of the polyvinyl acetal resin contained in the third layer is preferably greater than or equal to 160 $cm^{-1}$, more preferably greater than or equal to 180 $cm^{-1}$, still more preferably greater than or equal to 200 $cm^{-1}$, further preferably greater than or equal to 220 $cm^{-1}$ and still further preferably greater than or equal to 240 $cm^{-1}$.

From the viewpoint of further enhancing the flexural rigidity of laminated glass, in the constitution (2″), the half-value width of the hydroxyl group of the polyvinyl acetal resin contained in the third layer is preferably greater than or equal to 251 cm$^{-1}$, more preferably greater than or equal to 255 cm$^{-1}$ and further preferably greater than or equal to 270 cm$^{-1}$. The upper limit of the half-value width of the hydroxyl group of the polyvinyl acetal resin contained in the third layer is not particularly limited. The half-value width of the hydroxyl group of the polyvinyl acetal resin contained in the third layer may be less than or equal to 300 cm$^{-1}$.

The half-value width indicates the degree of intensity of hydrogen bonds. The hydrogen bonding force is affected by the content ratio of the hydroxyl group and the arrangement of hydroxyl groups. The hydrogen bonding force is not decided only by the content ratio of the hydroxyl group. As one factor affecting the arrangement of hydroxyl groups, the aging temperature at the time of the synthesis of the polyvinyl acetal resin can be exemplified. For example, even in the case where polyvinyl acetal resins which are the same as each other in content ratio of the hydroxyl group are obtained, when the aging temperature at the time of the synthesis of one polyvinyl acetal resin is set to a temperature higher than that of the other polyvinyl acetal resin, the hydroxyl groups are arranged so that the hydrogen bonding force is heightened and the half-value width of the hydroxyl group becomes large.

The half-value width can be evaluated according to a method described in the evaluation column for examples and the like described below.

Since the flexural rigidity can be sufficiently enhanced by virtue of the interlayer film, a first glass plate with a thickness less than or equal to 1 mm is used, and the interlayer f film is arranged between the first glass plate and a second glass plate to be suitably used for obtaining laminated glass. Since the flexural rigidity can be sufficiently enhanced by virtue of the interlayer film, a first glass plate with a thickness less than or equal to 1 mm and a second glass plate with a thickness less than or equal, to 1 mm are used, and the interlayer film is arranged between the first glass plate and the second glass plate to be more suitably used for obtaining laminated glass.

Hereinafter, specific embodiments of the present invention will be described with reference to the drawings.

FIG. 1 shows an interlayer film for laminated glass in accordance with the first embodiment of the present invention schematically represented as a sectional view.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 is provided with a first layer 1, a second layer 2 and a third layer 3. The first layer 1 is arranged on a first surface 2a of the second layer 2 to be layered thereon. The third layer 3 is arranged on a second surface 2b opposite to the first surface 2a of the second layer 2 to be layered thereon. The second layer 2 is an intermediate layer. Each of the first layer 1 and the third layer 3 is a protective layer and is a surface layer in the present embodiment. The second layer 2 is arranged between the first layer 1 and the third layer 3 to be sandwiched therebetween. Accordingly, the interlayer film 11 has a multilayer structure (a first layer 1/a second layer 2/a third layer 3) in which the first, layer 1, the second layer 2 and the third layer 3 are layered in this order.

In this connection, other layers may be arranged between the first layer 1 and the second layer 2 and between the second layer 2 and the third layer 3, respectively. It is preferred that each of the first layer 1 and the third layer 3 be directly layered on the second layer 2. Examples of the other layers include a layer containing polyethylene terephthalate and the like.

The first layer 1 contains a polyvinyl acetal resin and a plasticizer. With regard to the first layer 1, the interlayer film 11 has the above-mentioned constitution (1) or the above-mentioned constitution (2). It is preferred that the second layer 2 contain a polyvinyl acetal resin, and it is preferred that the second layer 2 contain a plasticizer. It is preferred that the third layer 3 contain a polyvinyl acetal resin, and it is preferred that the third layer 3 contain a plasticizer.

FIG. 2 shows an interlayer film for laminated glass in accordance with the second embodiment of the present invention schematically represented as a sectional view.

An interlayer film 11A shown in FIG. 2 is a single-layered interlayer film having a one-layer structure. The interlayer film 11A is a first layer. The interlayer film 11A is used for obtaining laminated glass. The interlayer film 11A is an interlayer film for laminated glass.

The interlayer film 11A (first layer) contains a polyvinyl acetal resin and a plasticizer. The interlayer film 11A has the above-mentioned constitution (1) or the above-mentioned constitution (2).

Hereinafter, the details of the first layer (including a single-layered interlayer film), the second layer and the third layer which constitute the interlayer film according to the present invention, and the details of each ingredient contained in the first layer, the second layer and the third layer will be described.

(Polyvinyl Acetal Resin or Thermoplastic Resin)

The first layer (including a single-layered interlayer film) contains a polyvinyl acetal resin (hereinafter, sometimes described as a polyvinyl acetal resin (1)). It is preferred that the second layer contain a thermoplastic resin (hereinafter, sometimes described as a thermoplastic resin (2)) and it is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)) and it is preferred that the third layer contain a polyvinyl acetal resin (hereinafter, sometimes described as a polyvinyl acetal resin (3)) as the thermoplastic resin (3). The polyvinyl acetal resin (1), the polyvinyl acetal resin (2) and the polyvinyl acetal resin (3) may be the same as or different from one another. One kind of each of the polyvinyl acetal resin (1), the polyvinyl acetal resin (2) and the polyvinyl acetal resin (3) may be used alone, and two or more kinds thereof may be used in combination. The thermoplastic resin (2) and the thermoplastic resin (3) may be the same as or different from each other. One kind of each of the thermoplastic resin (2) and the thermoplastic resin (3) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

For example, the polyvinyl acetal resin can be produced by acetalizing polyvinyl alcohol with an aldehyde. For example, the polyvinyl alcohol is obtained by saponifying polyvinyl acetate. The saponification degree of the polyvinyl alcohol generally lies within the range of 70 to 99.9% by mole.

The average polymerization degree of the polyvinyl alcohol is preferably greater than or equal to 200, more preferably greater than or equal to 500, still more preferably greater than or equal to 1500, further preferably greater than or equal to 1600, especially preferably greater than or equal to 2600, most preferably greater than or equal to 2700, preferably less than or equal to 5000, more preferably less than or equal to 4000 and further preferably less than or equal to 3500. When the average polymerization degree is greater than or equal to the above lower limit, the penetration resistance of laminated glass is further enhanced. When the average polymerization degree is less than or equal to the above upper limit, formation of an interlayer film is facilitated.

The average polymerization degree of the polyvinyl alcohol is determined by a method in accordance with JIS X6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin lie within the range of 3 to 5, and it is preferred that the number of carbon atoms of the acetal group be 3 or 4. When the number of carbon atoms of the acetal group in the polyvinyl acetal resin is greater than or equal to 3, the glass transition temperature of the interlayer film is sufficiently lowered.

The aldehyde is not particularly limited. In general, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octyladehyde, n-nonylaldehyde, n-decylaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or iscbutyraldehyde is more preferred, and n-butyraldehyde is further preferred. One kind of the aldehyde may be used alone, and two or more kinds thereof may be used in combination.

The content ratio of the hydroxyl group (the amount of hydroxyl groups) of the polyvinyl acetal resin (2) is preferably greater than or equal to 17% by mole, more preferably greater than or equal to 20% by mole, further preferably greater than or equal to 22% by mole, preferably less than or equal to 30% by mole, more preferably less than 27% by mole and further preferably less than or equal to 25% by mole. When the content ratio of the hydroxyl group is greater than or equal to the above lower limit, the adhesive force of the interlayer film is further heightened. In particular, when the content ratio of the hydroxyl group of the polyvinyl acetal resin (2) is greater than or equal to 20% by mole, the resin is high in reaction efficiency and is excellent in productivity, and moreover, when less than 27% by mole, the sound insulating properties of laminated glass are further heightened. Moreover, when the content ratio of the hydroxyl group is less than or equal to the above upper limit, the flexibility of the inter layer film is enhanced and the handling of the interlayer film is facilitated.

The content ratio of the hydroxyl group of each of the polyvinyl acetal resin (1) and the polyvinyl acetal resin (3) is preferably greater than or equal to 25% by mole, more preferably greater than or equal, to 28% by mole, further preferably greater than or equal to 30% by mole, especially preferably greater than or equal to 31% by mole, preferably less than or equal to 35% by mole, more preferably less than or equal to 34.5% by mole and further preferably less than or equal to 32% by mole. When the content ratio of the hydroxyl group is greater than or equal to the above lower limit, the adhesive force of the interlayer film is further heightened. Moreover, when the content ratio of the hydroxyl group is less than or equal to the above upper limit, the flexibility of the interlayer film is enhanced and the handling of the interlayer film is facilitated.

The content ratio of the hydroxyl group of the polyvinyl acetal resin is a molar fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6726 "Testing methods for polyvinyl alcohol" to be determined.

The acetylation degree (the amount of acetyl groups) of the polyvinyl acetal resin (2) is preferably greater than or equal to 0.01% by mole, more preferably greater than or equal to 0.1% by mole, still more preferably greater than or equal to 7% by mole, further preferably greater than or equal to 9% by mole, preferably less than or equal to 30% by mole, more preferably less than or equal to 25% by mole and further preferably less than or equal to 15% by mole. When the acetylation degree is greater than or equal to the above lower limit, the compatibility between the polyvinyl acetal resin and a plasticizer is heightened. When the acetylation degree is less than or equal to the above upper limit, the moisture resistance of the interlayer film and the laminated glass is enhanced. In particular, when the acetylation degree of the polyvinyl acetal resin (1) is greater than or equal to 0.1% by mole and less than or equal to 25% by mole, the laminated glass is excellent in penetration resistance.

The acetylation degree of each of the polyvinyl acetal resin (1) and the polyvinyl acetal resin (3) is preferably greater than or equal to 0.01% by mole, more preferably greater than or equal to 0.5% by mole, preferably less than or equal to 10% by mole and more preferably less than or equal to 2% by mole. When the acetylation degree is greater than or equal to the above lower limit, the compatibility between the polyvinyl acetal resin and a plasticizer is heightened. When the acetylation degree is less than or equal to the above upper limit, the moisture resistance of the interlayer film and the laminated glass is enhanced.

The acetylation degree is a molar fraction, represented in percentage, obtained by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain. For example, the amount of ethylene groups to which the acetal group is bonded can be measured in accordance with JIS K6728 "Testing methods for polyvinyl butyral".

The acetalization degree of the polyvinyl acetal resin (2) (the butyralization degree in the case of a polyvinyl butyral resin) is preferably greater than or equal, to 47% by mole, more preferably greater than or equal to 60% by mole, preferably less than or equal to 80% by mole, and more preferably less than or equal to 70% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree of each of the polyvinyl acetal resin (1) and the polyvinyl acetal resin (3) (the butyralization degree in the case of a polyvinyl butyral resin) is preferably greater than or equal to 55% by mole, more preferably greater than or equal to 67% by mole, preferably less than or equal, to 75% by mole and more preferably less than or equal to 71% by mole. When the acetalization degree is greater than or equal to the above lower limit, the compatibility between the polyvinyl acetal resin and a plasticizer is heightened. When the acetalization degree is less than or equal to the above upper limit, the reaction time required for producing the polyvinyl acetal resin is shortened.

The acetalization degree is a value expressing the mole fraction determined by dividing the amount of ethylene groups to which the acetal group is bonded by the total amount of ethylene groups in the main chain in terms of percentage. The acetalization degree can be calculated by a method in accordance with JIS K6728 "Testing methods for polyvinyl butyral".

In this connection, it is preferred that the content ratio of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 and JIS K6728 may be used. In the case where the polyvinyl acetal resin is a polyvinyl butyral resin, the content ratio of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (2) be a polyvinyl acetal resin (A) with an acetylation degree (a) less than or equal to 8% by mole and an acetalization degree (a) greater than or equal to 70% by mole or a polyvinyl acetal resin (B) with an acetylation degree (b) greater than 8% by mole. The polyvinyl acetal resin (1) may be the polyvinyl acetal resin (A), and may be the polyvinyl acetal resin (B). The polyvinyl acetal resin (2) may be the polyvinyl acetal resin (A), and may be the polyvinyl acetal resin (B).

The acetylation degree (a) of the polyvinyl acetal resin (A) is less than or equal to 8% by mole, preferably less than or equal to 7.5% by mole, more preferably less than or equal to 7% by mole, further preferably less than or equal to 6.5% by mole, especially preferably less than or equal to 5% by mole, preferably greater than or equal to 0.1% by mole, more preferably greater than or equal to 0.5% by mole, further preferably greater than or equal to 0.3% by mole and especially preferably greater than or equal to 1% by mole. When the acetylation degree (a) is less than or equal to the above upper limit and greater than or equal to the above lower limit, the transfer of a plasticizer can be easily controlled and the sound insulating properties of laminated glass are further heightened.

The acetalization degree (a) of the polyvinyl acetal resin (A) is greater than or equal to 70% by mole, preferably greater than or equal to 70.5% by mole, more preferably greater than or equal to 71% by mole, further preferably greater than or equal to 71.5% by mole, especially preferably greater than or equal to 72% by mole, preferably less than or equal to 85% by mole, more preferably less than or equal to 83% by mole, further preferably less than or equal to 81% by mole and especially preferably less than or equal to 79% by mole. When the acetalization degree (a) is greater than or equal to the above lower limit, the sound insulating properties of laminated glass are further heightened. When the acetalization degree (a) is less than or equal to the above upper limit, the reaction time required for producing the polyvinyl acetal resin (A) can be shortened.

The content ratio (a) of the hydroxyl group of the polyvinyl acetal resin (A) is preferably greater than or equal to 18% by mole, more preferably greater than or equal to 19% by mole, further preferably greater than or equal to 20% by mole, especially preferably greater than or equal to 21% by mole, preferably less than or equal to 31% by mole, more preferably less than or equal to 30% by mole, further preferably less than or equal to 29% by mole and especially preferably less than or equal to 28% by mole. When the content ratio (a) of the hydroxyl group is greater than or equal to the above lower limit, the adhesive force of the second layer is further heightened. When the content ratio (a) of the hydroxyl group is less than or equal to the above upper limit, the sound insulating properties of laminated glass are further heightened.

The acetylation degree (b) of the polyvinyl acetal resin (B) is greater than 8% by mole, preferably greater than or equal to 9% by mole, more preferably greater than or equal to 9.5% by mole, further preferably greater than or equal to 10% by mole, especially preferably greater than or equal to 10.5% by mole, preferably less than or equal to 30% by mole, more preferably less than or equal to 28% by mole, further preferably less than or equal to 26% by mole and especially preferably less than or equal to 24% by mole. When the acetylation degree (b) is greater than or equal to the above lower limit, the sound insulating properties of laminated glass are further heightened. When the acetylation degree (b) is less than or equal to the above upper limit, the reaction time required for producing the polyvinyl acetal resin (B) can be shortened.

The acetalization degree (b) of the polyvinyl acetal resin (B) is preferably greater than or equal to 50% by mole, more preferably greater than or equal to 53% by mole, further preferably greater than or equal to 55% by mole, especially preferably greater than or equal to 60% by mole, preferably less than or equal to 80% by mole, more preferably less than or equal to 78% by mole, further preferably less than or equal to 76% by mole and especially preferably less than or equal to 74% by mole. When the acetalization degree (b) is greater than or equal to the above lower limit, the sound insulating properties of laminated glass are further heightened. When the acetalization degree (b) is less than or equal to the above upper limit, the reaction time required for producing the polyvinyl acetal resin (B) can be shortened.

The content ratio (b) of the hydroxyl group of the polyvinyl acetal resin (B) is preferably greater than or equal to 18% by mole, more preferably greater than or equal to 19% by mole, further preferably greater than or equal to 20% by mole, especially preferably greater than or equal to 21% by mole, preferably less than or equal to 31% by mole, more preferably less than or equal to 30% by mole, further preferably less than or equal to 29% by mole and especially preferably less than or equal to 28% by mole. When the content ratio (b) of the hydroxyl group is greater than or equal to the above lower limit, the adhesive force of the second layer is further heightened. When the content ratio (b) of the hydroxyl group is less than or equal to the above upper limit, the sound insulating properties of laminated glass are further heightened.

It is preferred that each of the polyvinyl acetal resin (A) and the polyvinyl acetal resin (B) be a polyvinyl butyral resin.

(Plasticizer)

The first layer (including a single-layered interlayer film) contains a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By using a polyvinyl acetal resin and a plasticizer together, the adhesive force of a layer including the polyvinyl acetal resin and the plasticizer to a laminated glass member or another layer is moderately heightened. The plasticizer is not particularly limited. The plasticizer (1), the plasticizer (2) and the plasticizer (3) may be the same as or different from one another. One kind of the plasticizer may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

Examples of the monobasic organic acid ester include a glycol ester obtained by the reaction of a glycol and a monobasic organic acid. Examples of the glycol include triethylene glycol, tetraethylene glycol, tripropylene glycol and the like. Examples of the monobasic organic acid include butyric acid, isobutyric acid, caproic acid, 2-ethylbutyric acid, hepthylic acid, n-octylic acid, 2-ethylhezanoic acid, n-nonylic acid, decylic acid and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyd, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate and the like.

It is preferred that the plasticizer be a diester plasticizer represented by the following formula (1).

[Chemical 1]

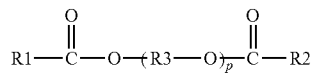

Formula (1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and P2 in the foregoing formula (1) each be an organic group with 5 to 10 carbon atoms, and it is more preferred that R1 and R2 each be an organic group with 6 to 10 carbon atoms.

It is preferred that the plasticizer be triethylene glycol di-2-ethylhexanoate (3GO), triethylene glycol di-2-ethylbutyrate (3GH) or triethylene glycol di-2-ethylpropanoate, it is more preferred that the plasticizer be triethylene glycol di-2-ethylhexanoate or triethylene glycol di-2-ethylbutyrate, and it is further preferred that the plasticizer be triethylene glycol di-2-ethylhexanoate.

In the case where the half-value width of the hydroxyl group of the polyvinyl acetal resin contained in the first layer is less than or equal to 250 $cm^{-1}$, the content of the plasticizer contained in the first layer relative to 100 parts by weight of the polyvinyl acetal resin contained in the first layer is greater than or equal to 5 parts by weight and less than 30 parts by weight. In the case where the half-value width of the hydroxyl group of the polyvinyl acetal resin contained in the third layer is less than or equal to 250 $cm^{-1}$, the content of the plasticizer contained in the third layer relative to 100 parts by weight of the polyvinyl acetal resin contained in the third layer is preferably greater than or equal to 5 parts by weight and preferably less than 30 parts by weight. When the content of the plasticizer is greater than or equal to 5 parts by weight and less than 30 parts by weight, it is possible to enhance the flexural rigidity of laminated glass. Each of the content of the plasticizer contained in the first layer relative to 100 parts by weight of the polyvinyl acetal resin contained in the first layer and the content of the plasticizer contained in the third layer relative to 100 parts by weight of the polyvinyl acetal resin contained in the third layer is preferably greater than or equal to 10 parts by weight, more preferably greater than or equal to 15 parts by weight, preferably less than or equal to 23 parts by weight, more preferably less than or equal to 26 parts by weight and further preferably less than or equal to 24 parts by weight. When the content of the plasticizer is greater than or equal to the above lower limit, the penetration resistance of the interlayer film for laminated glass is enhanced, and when less than or equal to the above upper limit, it is possible to further enhance the flexural rigidity of laminated glass.

In the case where the half-value width of the hydroxyl group of the polyvinyl acetal resin contained in the first layer is greater than 250 $cm^{-1}$, each of the content of the plasticizer contained in the first layer relative to 100 parts by weight of the polyvinyl acetal resin contained in the first layer and the content of the plasticizer contained in the third layer relative to 100 parts by weight of the polyvinyl acetal resin contained in the third layer is preferably greater than or equal to 10 parts by weight, more preferably greater than or equal to 12 parts by weight, further preferably greater than or equal to 15 parts by weight, especially preferably greater than 30 parts by weight, preferably less than or equal to 35 parts by weight, more preferably less than or equal to 34 parts by weight and further preferably less than or equal to 33 parts by weight. When the content of the plasticizer is greater than or equal to the above lower limit, the penetration resistance of the interlayer film for laminated glass is enhanced, and when less than or equal to the above upper limit, it is possible to further enhance the flexural rigidity of laminated glass.

In order to impart the interlayer film for laminated glass with a specific function, a second layer is sometimes allowed to become a layer more flexible than the first layer and the third layer. For example, in order to impart the interlayer film for laminated glass with sound insulating properties, the glass transition temperature of a second layer is sometimes allowed to be lower than the glass transition temperature of a first layer or to be lower than the glass transition temperature of a third layer. Although the sound insulating properties of the resulting laminated glass are heightened, the flexural rigidity of the laminated glass is lowered due to the flexible layer. As described above, it is difficult to achieve both sound insulating properties and rigidity of laminated glass. However, by virtue of the constitution in which the half-value width of the hydroxyl group of the polyvinyl acetal resin contained in each of the first layer and the third layer is less than or equal to 250 $cm^{-1}$ and the content of the plasticizer contained in each of the first layer and the third layer relative to 100 parts by weight of the polyvinyl acetal resin contained in each of the first layer and the third layer is greater than or equal to 5 parts by weight, and less than 30 parts by weight, or the half-value width of the hydroxyl group of the polyvinyl acetal resin contained in each of the first layer and the third layer is greater than 250 $cm^{-1}$, it is possible to heighten the rigidity of laminated glass while maintaining the sound insulating properties thereof.

The content of the plasticizer contained in the second layer is not particularly limited. The content of the plasticizer contained in the second layer relative to 100 parts by weight of the thermoplastic resin (100 parts by weight of a polyvinyl acetal resin in the case where the thermoplastic resin is a polyvinyl acetal resin) contained in the second layer is preferably greater than 50 parts by weight, more preferably greater than or equal to 55 parts by weight, further preferably greater than or equal to 60 parts by weight, preferably less than or equal to 100 parts by weight, more preferably less than or equal to 90 parts by weight, further preferably less than or equal to 85 parts by weight and especially preferably less than or equal to 80 parts by weight. When the content of the plasticizer is greater than or equal to the above lower limit, the sound insulating properties of laminated glass are improved, and when the content of the plasticizer is less than or equal to the above upper limit, the penetration resistance of laminated glass is improved.

The content of the plasticizer contained in the second layer relative to 100 parts by weight of the thermoplastic resin (100 parts by weight of a polyvinyl acetal resin in the case where the thermoplastic resin is a polyvinyl acetal resin) contained in the second layer is preferably larger by 21 parts by weight or more, more preferably larger by 22 parts by weight or more and further preferably larger by 25 parts by weight or more, than the content of the plasticizer contained in the first layer relative to 100 parts by weight of the polyvinyl acetal resin contained in the first layer. The content of the plasticizer contained in the second layer relative to 100 parts by weight of the thermoplastic resin (100 parts by weight of a polyvinyl acetal resin in the case where the thermoplastic resin is a polyvinyl acetal resin) contained in the second layer is preferably larger by 21 parts by weight or more, more preferably larger by 22 parts by weight or more and further preferably larger by 25 parts by weight or more, than the content of the plasticizer contained in the third layer relative to 100 parts by weight of the polyvinyl acetal resin contained in the third layer. Even when the content of the plasticizer contained in the second layer is large, by virtue of the constitution in which the half-value width of the hydroxyl group of the polyvinyl acetal resin contained in each of the first layer and the third layer is less than or equal to 250 $cm^{-1}$ and the content of the plasticizer contained in each of the first layer and the third layer relative to 100 parts by weight of the polyvinyl acetal resin contained in each of the first layer and the third layer is greater than or equal, to 5 parts by weight and less than 30 parts by weight, or the half-value width of the hydroxyl group of the polyvinyl acetal resin contained in each of the first layer and the third layer is greater than 250 $cm^{-1}$, it is possible to heighten the rigidity of laminated glass while maintaining the sound insulating properties thereof.

(Heat Shielding Compound)

It is preferred that the interlayer film contain a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

Ingredient X:

It is preferred that the interlayer film contain at least one kind of Ingredient X among a phthalocyanine compound, a naphthalocyanine compound and an anthracycline compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracycline compound can be used.

Examples of the Ingredient X include phthalocyanine, a derivative of phthalocyanine, naphthalocyanine, a derivative of naphthalocyanine, anthracycline, a derivative of anthracycline, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracycline compound and the derivative of anthracycline have an anthracycline skeleton.

From the viewpoint of further heightening the heat shielding properties of the interlayer film and laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding properties of the interlayer film and the laminated glass, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably greater than or equal to 0.001% by weight, more preferably greater than or equal to 0.005% by weight, further preferably greater than or equal to 0.01% by weight, especially preferably greater than or equal to 0.02% by weight, preferably less than or equal to 0.2% by weight, more preferably less than or equal to 0.1% by weight, further preferably less than or equal to 0.05% by weight and especially preferably less than or equal to 0.04% by weight. When the content of the Ingredient X is greater than or equal to the above lower limit and less than or equal to the above upper limit, the heat shielding properties are sufficiently enhanced and the visible light transmittance is sufficiently heightened. For example, it is possible to allow the visible light transmittance to be greater than or equal to 70%.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. The heat shielding particle is a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength greater than or equal to 780 nm which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are TTO particles or tungsten oxide particles. In particular, since the heat ray shielding function is high and the particles are readily available, preferred are tin-doped indium oxide particles (ITO particles), and also preferred are tungsten oxide particles.

The tungsten oxide particles are generally represented by the following formula (X1) or the following formula (X2). In the interlayer film, the tungsten oxide particles represented by the following formula (X1) or the following formula (X2) are suitably used.

$$W_yO_x \quad \text{Formula (X1)}$$

In the foregoing formula (X1), W represents tungsten, O represents oxygen, and y and z satisfy the relation of $2.0 < z/y < 3.0$.

$$M_xW_yO_x \quad \text{Formula (X2)}$$

In the foregoing formula (X2), M represents at least one kind of element selected from the group consisting of H, He, an alkali metal, an alkaline earth metal, a rare earth element, Mg, Zr, Cr, M, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re, W represents tungsten, O represents oxygen, and x, y and z satisfy the relations of $0.001 \le x/y \le 1$ and $2.0 < z/y \le 3.0$.

From the viewpoint of further heightening the heat shielding properties of the interlayer film and laminated glass, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

From the viewpoint of further heightening the heat shielding properties of the interlayer film and laminated glass, cesium-doped tungsten oxide particles are especially preferred. From the viewpoint of still further heightening the heat shielding properties of the interlayer film and laminated glass, it is preferred that the cesium-doped tungsten oxide particles be tungsten oxide particles represented by the formula: $Cs_{0.33}WO_3$.

The average particle diameter of the heat shielding particles is preferably greater than or equal to 0.01 μm, more preferably greater than or equal to 0.02 μm, preferably less than or equal to 0.1 μm and more preferably less than or equal to 0.05 μm. When the average particle diameter is greater than or equal to the above lower limit, the heat ray shielding properties are sufficiently heightened. When the average particle diameter is less than or equal to the above upper limit, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), the content of the heat shielding particles is preferably greater than or equal to 0.01% by weight, more preferably greater than or equal to 0.1% by weight, further preferably greater than or equal to 1% by weight, especially preferably greater than or equal to 1.5% by weight, preferably less than or equal to 6% by weight, more preferably less than or equal to 5.5% by weight, further preferably less than or equal to 4% by weight, especially preferably less than or equal to 3.5% by weight and most preferably less than or equal to 3.0% by weight. When the content of the heat shielding particles is greater than or equal to the above lower limit and less than or equal to the above upper limit, the heat shielding properties are sufficiently heightened and the visible light transmittance is sufficiently heightened.

It is preferred that a layer containing the heat shielding particles (a first layer, a second layer or a third layer) contain the heat shielding particles in a proportion greater than or equal to 0.1 $g/m^2$ and less than or equal to 12 $g/m^2$. In the case where the proportion of the heat shielding particles lies within the above-mentioned range, the heat shielding properties are sufficiently heightened and the visible light transmittance is sufficiently heightened. The proportion of the heat shielding particles is preferably greater than or equal to 0.5 $g/m^2$, more preferably greater than or equal to 0.8 $g/m^2$, further preferably greater than or equal to 1.5 $g/m^2$, especially preferably greater than or equal to 3 $g/m^2$, preferably less than or equal to 11 $g/m^2$, more preferably less than or equal to 10 $g/m^2$, further preferably less than or equal to 9 $g/m^2$ and especially preferably less than or equal to 7 $g/m^2$. When the proportion is greater than or equal to the above lower limit, the heat shielding properties are further heightened. When the proportion is less than or equal to the above upper limit, the visible light transmittance is further heightened.

(Metal Salt)

It is preferred that the interlayer film contain at least one kind of metal salt (hereinafter, sometimes described as Metal salt M) among an alkali metal salt and an alkaline earth metal salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

Moreover, it is more preferred that the Metal salt M be an alkali metal salt of an organic acid with 2 to 16 carbon atoms or an alkaline earth metal salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer or a third layer) is preferably greater than or equal to 5 ppm, more preferably greater than or equal to 10 ppm, further preferably greater than or equal to 20 ppm, preferably less than or equal to 300 ppm, more preferably less than or equal to 250 ppm and further preferably less than or equal to 200 ppm. When the total of the contents of Mg and K is greater than or equal to the above lower limit and less than or equal to the above upper limit, the adhesivity between the interlayer film and a glass plate or the adhesivity between respective layers in the inter layer film can be further well controlled.

(Ultraviolet Ray Shielding Agent)

It is preferred that the interlayer film contain an ultraviolet ray shielding agent. It is preferred that the first layer contain an ultraviolet ray shielding agent. It is preferred that the second layer contain an ultraviolet ray shielding agent. It is preferred that the third layer contain an ultraviolet ray shielding agent. By the use of an ultraviolet ray shielding agent, even when the interlayer film and the laminated glass are used for a long period of time, the visible light transmittance becomes further less likely to be lowered. One kind of the ultraviolet ray shielding agent may be used alone, and two or more kinds thereof may be used in combination.

Examples of the ultraviolet ray shielding agent include an ultraviolet ray absorber. It is preferred that the ultraviolet ray shielding agent be an ultraviolet ray absorber.

Examples of the ultraviolet ray shielding agent include a metal-based ultraviolet ray shielding agent, a metal oxide-based ultraviolet ray shielding agent, a benzotriazole-based ultraviolet ray shielding agent, a benzophenone-based ultraviolet ray shielding agent, a triazine-based ultraviolet ray shielding agent, a malonic acid ester-based ultraviolet ray shielding agent, an oxanilide-based ultraviolet ray shielding agent, a benzoate-based ultraviolet ray shielding agent, and the like.

Examples of the metal-based ultraviolet ray absorber include platinum particles, particles in which the surface of platinum particles is coated with silica, palladium particles, particles in which the surface of palladium particles is coated with silica, and the like. It is preferred that the ultraviolet ray shielding agent, not be heat shielding particles.

The ultraviolet ray shielding agent, is preferably a benzotriazole-based ultraviolet ray shielding agent, a benzophenone-based ultraviolet ray shielding agent, a triazine-based ultraviolet ray shielding agent or a benzoate-based ultraviolet ray shielding agent, more preferably a benzotriazole-based ultraviolet ray shielding agent or a benzophenone-based ultraviolet ray shielding agent, and further preferably a benzotriazole-based ultraviolet ray shielding agent.

Examples of the metal oxide-based ultraviolet ray absorber include zinc oxide, titanium oxide, cerium oxide and the like. Furthermore, in the metal oxide-based ultraviolet ray absorber, the surface thereof may be coated. Examples of a coating material for the surface of the metal oxide-based ultraviolet ray absorber include an insulating metal oxide, a hydrolyzable organosilicon compound, a silicone compound and the like.

Examples of the insulating metal oxide include silica, alumina, zirconia and the like. For example, the insulating metal oxide has a band-gap energy greater than or equal to 5.0 eV.

Examples of the benzotriazole-based ultraviolet ray absorber include benzotriazole-based ultraviolet ray absorbers such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3', 5'-di-amylphenyl)benzotriazole ("Tinuvin 328" available from BASF Japan Ltd.). It is preferred that the ultraviolet ray shielding agent be a benzotriazole-based ultraviolet ray absorber containing halogen atoms, and it is more preferred that the ultraviolet ray shielding agent be a benzotriazole-based ultraviolet ray absorber containing chlorine atoms, since those are excellent in ultraviolet ray absorbing performance.

Examples of the benzophenone-based ultraviolet ray absorber include octabenzone ("Chimassorb 81" available from BASF Japan Ltd.) and the like.

Examples of the triazine-based ultraviolet ray absorber include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.) and the like.

Examples of the malonic acid ester-based ultraviolet ray shielding agent include dimethyl-2-(p-methoxybenzylidene) malonate, tetraethyl-2,2-(1,4-phenylenedimethylidyne)bis-malonate, 2-(p-methoxybenzylidene)-bis(1,2,2,6,6-pentamethyl-4-piperidinyl)malonate and the lake.

Examples of a commercial product of the malonic acid ester-based ultraviolet ray shielding agent include Hostavin B-CAP, Hostavin PR-25 and Hostavin PR-31 (any of these is available from Clariant Japan K.K.).

Examples of the oxanilide-based ultraviolet ray shielding agent include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxyanilide ("Sanduvor VSU" available from Clariant Japan K.K.).

Examples of the benzoate-based ultraviolet ray absorber include 2,4-di-tert-butylphenyl-3,5-di-tert-butyl-4-hydroxy-benzoate ("Tinuvin 120" available from BASF Japan Ltd.) and the like.

From the viewpoint of further suppressing the lowering in visible light transmittance after the lapse of a certain period of time, in 100% by weight of a layer containing the ultraviolet ray shielding agent (a first layer, a second layer or a third layer), the content of the ultraviolet ray shielding agent is preferably greater than or equal to 0.1% by weight, more preferably greater than or equal to 0.2% by weight, further preferably greater than or equal to 0.3% by weight, especially preferably greater than or equal to 0.5% by weight, preferably less than or equal to 2.5% by weight, more preferably less than or equal to 2% by weight, further preferably less than or equal to 1% by weight and especially preferably less than or equal to 0.8% by weight. In particular, by allowing the content of the ultraviolet ray shielding agent to be greater than or equal to 0.2% by weight in 100% by weight of a layer containing the ultraviolet ray shielding agent, the lowering in visible light transmittance of the interlayer film and the laminated glass after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl) butane, tetrakis[methylene-3-(3',5'-butyl-4-hydroxyphenyl) propionate]methane, 1,3,3-tris-(2-methyl-4-hydroxy-5-t-butylphenol)butane, 1,3,5-trimethyl-2,4,6-tris (3,5-di-t-butyl-4-hydroxybenzyl)benzene, bis(3,3'-t-butylphenol) butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis (decyl) pentaerithritol diphosphite, tris(2,4-di-t-butylphenyl)phosphite, bis (2,4-di-t-butyl-6-methylphenyl)ethyl ester phosphorous acid, tris(2,4-di-t-butylphenyl)phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "Sumilizer BHT" available from Sumitomo Chemical Co., Ltd., "Irganox 1010" available from Nihon Ciba-Geigy K.K., and the like.

In order to maintain high visible light transmittance of the interlayer film and the laminated glass over a long period of time, it is preferred that the content of the oxidation inhibitor be greater than or equal to 0.1% by weight in 100% by weight of the interlayer film or in 100% by weight of a layer containing the oxidation inhibitor (a first layer, a second layer or a third layer). Moreover, since an effect commensurate with the addition of an oxidation inhibitor is not attained, it is preferred that the content of the oxidation inhibitor be less than or equal to 2% by weight in 100% by weight of the interlayer film or in 100% by weight of a layer containing the oxidation inhibitor.

(Other Ingredients)

Each of the first layer, the second layer and the third layer may include additives such as a flame retardant, an antistatic agent, a pigment, a dye, an adhesive force regulating agent, a moisture-resistance improving agent, a fluorescent, brightening agent, and an infrared ray absorber, as necessary. One kind of these additives may be used alone, and two or more kinds thereof may be used in combination.

(Other Details of Interlayer Film for Laminated Glass)

From the viewpoint of further enhancing the flexural rigidity of laminated glass, each of the glass transition temperatures of the first layer and the third layer is preferably higher than or equal to 31° C., more preferably higher than or equal to 33° C. and further preferably higher than or equal to 35° C. The upper limit of the glass transition temperature of each of the first layer and the third layer is not particularly limited. From the viewpoint of further heightening the sound insulating properties of the interlayer film, the glass transition temperature of each of the first, layer and the third layer may be lower than or equal to 60° C.

The thickness of the interlayer film is not particularly limited. From the viewpoint of the practical aspect and the viewpoint of sufficiently enhancing the penetration resistance and the flexural rigidity of laminated glass, the thickness of the interlayer film is preferably greater than or equal to 0.1 mm, more preferably greater than or equal to 0.25 mm, preferably less than or equal to 3 mm and more preferably less than or equal to 1.5 mm. When the thickness of the interlayer film is greater than or equal to the above lower limit, the penetration resistance and the flexural rigidity of laminated glass are enhanced. When the thickness of the interlayer film is less than or equal to the above upper limit, the transparency of the interlayer film is further improved.

The thickness of the interlayer film is defined as T. In the case of a multi-layered interlayer film, the thickness of the second layer is preferably greater than or equal to 0.0625T, more preferably greater than or equal to 0.1T, preferably less than or equal to 0.375T and more preferably less than or equal to 0.25T. For example, in order to impart the interlayer film for laminated glass with sound insulating properties, the glass transition temperature of the second layer is sometimes allowed to be lower than the glass transition temperature of each of the first layer and the third layer. Specifically, in the case where the content of the plasticizer contained in the second layer relative to 100 parts by weight of the polyvinyl acetal resin contained in the second layer is larger than the content of the plasticizer contained in the first layer relative to 100 parts by weight of the polyvinyl acetal resin contained in the first layer or the content of the plasticizer contained in the second layer relative to 100 parts by weight of the polyvinyl acetal resin contained in the second layer is larger than the content of the plasticizer contained in the third layer relative to 100 parts by weight of the polyvinyl acetal resin contained in the third layer, the flexural rigidity of laminated glass is lowered. By allowing an interlayer film to have a constitution in which the half-value width of the hydroxyl group of the polyvinyl acetal resin contained in the first layer is less than or equal to 250 $cm^{-1}$ and the content of the plasticizer contained in the first layer relative to 100 parts by weight of the polyvinyl acetal resin contained in the first layer is greater than or equal to 5 parts by weight and less than 30 parts by weight, or the half-value width of the hydroxyl group of the polyvinyl acetal resin contained in the first layer is greater than 250 $cm^{-1}$, and allowing the thickness of the second layer to be greater than or equal to 0.0625T and less than or equal to 0.375T, it is possible to further heighten the sound insulating properties and the rigidity of laminated glass. By allowing an interlayer film to have a constitution in which the half-value width of the hydroxyl group of the polyvinyl acetal resin contained in each of the first layer and the third layer is less than or equal to 250 $cm^{-1}$ and the content of the plasticizer contained in each of the first layer and the third layer relative to 100 parts by weight of the polyvinyl acetal resin contained in each of the first layer and the third layer is greater than or equal to 5 parts by weight and less than 30 parts by weight, or the half-value width of the hydroxyl group of the polyvinyl acetal resin contained in each of the first layer and the third layer is greater than 250 $cm^{-1}$, and allowing the thickness of the second layer to be greater than or equal to 0.0625T and less than or equal to 0.375T, it is possible to further heighten the sound insulating properties and the rigidity of laminated glass. The thickness of the second layer is more preferably greater than or equal to 0.075, further preferably greater than or equal to 0.09, especially preferably greater than or equal to 0.1, more preferably less than or equal to 0.37, further preferably less than or equal to 0.33 and especially preferably less than or equal to 0.27.

Since the rigidity of laminated glass can be further heightened, the maximum thickness of the second layer is preferably smaller, more preferably smaller by 100 μm or more, further preferably smaller by 300 μm or more and especially preferably smaller by 500 μm or nore, than the maximum thickness of the interlayer film.

Each thickness of the first layer and the third layer is preferably greater than or equal to 0.3125T, more preferably greater than or equal to 0.375T, preferably less than or equal to 0.9375T and more preferably less than or equal to 0.9T. Each thickness of the first layer and the third layer may be less than or equal to 0.46875T and may be less than or equal to 0.45T. Moreover, when each thickness of the first layer and the third layer is greater than or equal to the above lower limit and less than or equal to the above upper limit, the flexural rigidity of laminated glass is further enhanced and it is possible to suppress the bleed-out of the plasticizer.

In the case where the interlayer film for laminated glass has only a one-layer structure, that is, in the case where the interlayer film for laminated glass is composed only of the first layer, since the rigidity of laminated glass is further heightened, the thickness of the first layer is preferably greater than or equal to 760 μm, more preferably greater than 760 μm, further preferably greater than 800 μm, especially preferably greater than or equal to 1000 μm and most preferably greater than or equal to 1500 μm.

The total thickness of the first layer and the third layer is preferably greater than or equal to 0.625T, more preferably greater than or equal to 0.75T, preferably less than or equal to 0.9375T and more preferably less than or equal to 0.9T. Moreover, when the total thickness of the first layer and the third layer is greater than or equal to the above lower limit and less than or equal to the above upper limit, the flexural rigidity of laminated glass is further enhanced and it is possible to suppress the bleed-out of the plasticizer.

Examples of the method for measuring the thickness of each of the first layer, the second layer and the third layer include the following method. The Digital Microscope VHX-100 available from KEYENCE CORPORATION is used. As an objective lens, a lens capable of selecting a magnification within the range of ×25 to ×175 is used and the magnification is set to ×175. A cross-section of the interlayer film is observed with the digital microscope on the Transmission Light BOX A3-3, which is an illuminator available from Kabushiki gaisha S.F.C. The thicknesses of respective layers in the interlayer film are measured by means of a mode for measuring the distance between two points as a measuring tool in the VHX Main Menu. At the time of observing a cross-section of the interlayer film, it is preferred that the cross-section as a part to be observed be previously trimmed and made smooth with a sharp-edged blade to perform the observation.

The production method of the interlayer film according to the present invention is not particularly limited. In the case of a single-layered interlayer film, examples of the production method of the interlayer film according to the present invention include a method of allowing a resin composition to be extruded using an extruder. In the case of a multi-layered interlayer film, examples of the production method of the interlayer film according to the present invention include a method of separately forming respective resin compositions used for constituting respective layers into respective layers, and then, for example, allowing the respective obtained layers to be layered, a method of allowing respective resin compositions used for constituting respective layers to be coextruded using an extruder and allowing the respective layers to be layered, and the like. A production method of extrusion-molding is preferred because the method is suitable for continuous production.

It is preferred that the first layer and the third layer contain the same polyvinyl acetal resin as each other, it is more preferred that the first layer and the third layer contain the same polyvinyl acetal resin as each other and the same plasticizer as each other, and it is further preferred that the first layer and the third layer be formed from the same resin composition as each other, since these interlayer films are excellent in production efficiency.

It is preferred that at least one surface of surfaces of both sides of the interlayer film have a recess/protrusion shape. It is more preferred that surfaces of both sides of the interlayer film have a recess/protrusion shape. The method for forming the recess/protrusion shape is not particularly limited, and examples thereof include an embossing roll method, a calender roll method, a profile extrusion method, and the like. Of these, since it is possible to quantitatively form a plurality of embosses with a recess/protrusion shape constituting a constant uneven pattern, the embossing roll method is preferred.

(Laminated Glass)

FIG. 3 is a sectional view schematically showing an example of laminated glass prepared with the interlayer film for laminated glass shown in FIG. 1.

Laminated glass 31 shown in FIG. 3 is provided with a first glass plate 21, a second glass plate 22 and an interlayer film 11. The interlayer film 11 is arranged between the first glass plate 21 and the second glass plate 22 to be sandwiched therebetween.

The first glass plate 21 is layered on a first surface 11a of the interlayer film 11. The second glass plate 22 is layered on a second surface 11b opposite to the first surface 11a of the interlayer film 11. The first glass plate 21 is layered on an outer surface 1a of a first layer 1. The second glass plate 22 is layered on an outer surface 3a of a third layer 3.

FIG. A is a sectional view schematically showing an example of laminated glass prepared with the interlayer film for laminated glass shown in FIG. 2.

Laminated glass 31A shown in FIG. 4 is provided with a first glass plate 21, a second glass plate 22 and an interlayer film 11A. The interlayer film 11A is arranged between the first glass plate 21 and the second glass plate 22 to be sandwiched therebetween.

The first glass plate 21 is layered on a first surface 11a of the interlayer film 11A. The second glass plate 22 is layered on a second surface 11b opposite to the first surface 11a of the interlayer film 11A.

As described above, the laminated glass according to the present invention is provided with a first glass plate, a second glass plate and an interlayer film, and the interlayer film is the interlayer film for laminated glass according to the present invention. In the laminated glass according to the present invention, the above-mentioned interlayer film is arranged between the first glass plate and the second glass plate.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, net-reinforced plate glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl(meth)acrylate plate, and the like.

The thickness of the glass plate is preferably greater than or equal to 0.5 mm, more preferably greater than or equal to 0.7 mm, preferably less than or equal to 5 mm and more preferably less than or equal to 3 mm.

By the use of the inter layer film according to the present invention, it is possible to maintain the flexural rigidity of laminated glass high even when the thickness of the laminated glass is thinned. From the viewpoints of attaining reduced weight of laminated glass and decreasing the amount of the material for laminated glass to reduce the environmental load, and improving fuel consumption of an automobile by reduction in weight of laminated glass to reduce the environmental load, the thickness of the glass plate is preferably less than or equal to 2 mm, more preferably less than or equal to 1.8 mm, still more preferably less than or equal to 1.5 mm, further preferably less than or equal to 1 mm, still further preferably less than or equal to 0.8 mm and especially preferably less than or equal to 0.7 mm.

The production method of the laminated glass is not particularly limited. For example, an interlayer film is sandwiched between the first glass plate and the second glass plate, and the air remaining between each of the first glass plate and the second glass plate and the interlayer film is removed by allowing the stacked body to pass through a pressing roll or by putting the stacked body into a rubber bag and allowing the contents to be sucked under reduced pressure. Afterward, the plates are preliminarily bonded together at about 70 to 110° C. to obtain a laminate. Next, by putting the laminate into an autoclave or by pressing the laminate, the plates are press-bonded together at about 120 to 150° C. and under a pressure of 1 to 1.5 MPa. In this way, laminated glass can be obtained. At the time of producing the laminated glass, a first layer, a second layer and a third layer may be layered.

The interlayer film and the laminated glass can be used for automobiles, railway vehicles, aircraft, ships, buildings and the like. The interlayer film and the laminated glass can also be used for applications other than these applications. It is preferred that the inter layer film and the laminated glass be an interlayer film and laminated glass for vehicles or for building, and it is more preferred that the interlayer film and the laminated glass be an interlayer film and laminated glass for vehicles. The interlayer film and the laminated glass can be used for a windshield, side glass, rear glass or roof glass of an automobile and the like. The interlayer film and the laminated glass are suitably used for automobiles. The interlayer film is used for obtaining laminated glass of an automobile.

Hereinafter, the present invention will be described in more detail with reference to examples. The present invention is not limited only to these examples.

The following materials were prepared.

(Polyvinyl Acetal Resin)

With regard to the polyvinyl butyral (PVB) resin used in the following examples and comparative examples, the butyralization degree (the acetalization degree), the acetylation degree and the content ratio of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

SYNTHESIS EXAMPLE 1

Synthesis of Polyvinyl Acetal Resin A:

In a reactor equipped with a stirring apparatus, 2700 ml of ion-exchanged water and 300 g of polyvinyl alcohol with an average polymerization degree of 1700 and a saponification degree of 99.1% by mole were placed, and the content were heated and dissolved with stirring to obtain a solution. Next, to this solution, 21 g of 35.5% by weight hydrochloric acid as a catalyst was added, the temperature was adjusted to 17° C., and then, 154 g of n-butyraldehyde was added with stirring, whereupon a polyvinyl butyral resin in a white particulate form precipitated. At 20 minutes after the precipitation, 172 g of 35.5% by weight hydrochloric acid was added, and the contents were heated to 60° C. and aged for 2 hours at 66° C. Then, the solution was cooled and neutralized, after which the polyvinyl butyral resin was washed with water and dried to obtain Polyvinyl acetal resin A.

With regard to the obtained Polyvinyl acetal resin A, polyvinyl alcohol (PVA) with an average polymerization degree of 1700 was used, the content ratio of the hydroxyl group was 34.4% by mole, the acetylation degree was 0.8% by mole, the acetalization degree (butyralization degree) was 64.8% by mole, and the half-value width was 274.8 $cm^{-1}$.

SYNTHESIS EXAMPLE 2

Synthesis of Polyvinyl Acetal Resin B:

In a reactor equipped with a stirring apparatus, 2700 ml of ion-exchanged water and 300 g of polyvinyl alcohol with an average polymerization degree of 1700 and a saponification degree of 99.1% by mole were placed, and the contents were heated and dissolved with stirring to obtain a solution. Next, to this solution, 21 g of 35.5% by weight hydrochloric acid as a catalyst was added, the temperature was adjusted to 17° C., and then, 165 g of n-butyraldehyde was added with stirring, whereupon a polyvinyl butyral resin in a white particulate form precipitated. At 20 minutes after the precipitation, 240 g of 35.5% by weight hydrochloric acid was added, and the contents were heated to 55° C. and aged for 2 hours at 58° C. Then, the solution was cooled and neutralized, after which the polyvinyl butyral resin was washed with water and dried to obtain Polyvinyl acetal resin B.

With regard to the obtained Polyvinyl acetal resin B, polyvinyl alcohol (PVA) with an average polymerization degree of 1700 was used, the content ratio of the hydroxyl group was 30.0% by mole, the acetylation degree was 0.9% by mole, the acetalization degree (butyralization degree) was 69.1% by mole, and the half-value width was 239.3 $cm^{-1}$.

SYNTHESIS EXAMPLE 3

Synthesis of Polyvinyl Acetal Resin X:

In a reactor equipped with a stirring apparatus, 3290 ml of ion-exchanged water and 300 g of polyvinyl alcohol with an average polymerization degree of 2300 and a saponification degree of 87.3% by mole were placed, and the contents were heated and dissolved with stirring to obtain a solution. Next, to this solution, 74 g of 35.5% by weight hydrochloric acid as a catalyst was added, the temperature was adjusted to 12° C., and then, 183 g of n-butyraldehyde was added with stirring, whereupon a polyvinyl butyral resin in a white particulate form precipitated. At 20 minutes after the precipitation, 277 g of 35.5% by weight hydrochloric acid was added, and the contents were heated to 51° C. and aged for 3 hours at 56° C. Then, the solution was cooled and neutralized, after which the polyvinyl butyral resin was washed with water and dried to obtain Polyvinyl acetal resin X.

With regard to the obtained Polyvinyl acetal resin X, the resin is a polyvinyl butyral (PVB) resin, polyvinyl alcohol (PVA) with an average polymerization degree of 2300 was used, the content ratio of the hydroxyl group was 22.7% by mole, the acetylation degree was 12.1% by mole, the acetalization degree (butyralization degree) was 65.2% by mole, and the half-value width was 164.9 $cm^{-1}$.

SYNTHESIS EXAMPLE 4

Synthesis of Polyvinyl Acetal Resin C:

In a reactor equipped with a stirring apparatus, 2700 ml of ion-exchanged water and 300 g of polyvinyl alcohol with an average polymerization degree of 1700 and a saponification degree of 99.1% by mole were placed, and the contents were heated and dissolved with stirring to obtain a solution. Next, to this solution, 21 g of 35.5% by weight hydrochloric acid as a catalyst was added, the temperature was adjusted to 14° C., and then, 154 g of n-butyraldehyde was added with stirring, whereupon a polyvinyl butyral resin in a white particulate form precipitated. At 20 minutes after the precipitation, 134 g of 35.5% by weight hydrochloric acid was added, and the contents were heated to 55° C. and aged for 2.0 hours at 60° C. Then, the solution was cooled and neutralized, after which the polyvinyl butyral resin was washed with water and dried to obtain Polyvinyl acetal resin C.

With regard to the obtained Polyvinyl acetal resin C, polyvinyl alcohol (PVA) with an average polymerization degree of 1700 was used, the content ratio of the hydroxyl group was 35% by mole, the acetylation degree was 0.8% by mole, the acetalization degree (butyralization degree) was 64.2% by mole, and the half-value width was 251 $cm^{-1}$.

SYNTHESIS EXAMPLE 5

Synthesis of Polyvinyl Acetal Resin D:

In a reactor equipped with a stirring apparatus, 2500 ml of ion-exchanged water and 300 g of polyvinyl alcohol with an average polymerization degree of 1700 and a saponification degree of 99.1% by mole were placed, and the contents were heated and dissolved with stirring to obtain a solution. Next, to this solution, 22.6 g of 60% by weight, nitric acid as a catalyst was added, the temperature was adjusted to 14° C., and then, 169 g of n-butyraldehyde was added with stirring, whereupon a polyvinyl butyral resin in a white particulate form precipitated. At 20 minutes after the precipitation, 86.3 g of 60% by weight nitric acid was added, and the contents were heated to 50° C. and aged for 3.0 hours at 55° C. Then, the solution was cooled and neutralized, after which the polyvinyl butyral resin was washed with water and dried to obtain Polyvinyl acetal resin D.

With regard to the obtained Polyvinyl acetal resin D, polyvinyl alcohol (PVA) with an average polymerization degree of 1700 was used, the content ratio of the hydroxyl group was 29.4% by mole, the acetylation degree was 0.9% by mole, the acetalization degree (butyralization degree) was 69.7% by mole, and the half-value width was 235.6 $cm^{-1}$.

SYNTHESIS EXAMPLE 6

Synthesis of Polyvinyl Acetal Resin Y:

In a reactor equipped with a stirring apparatus, 3267 ml of ion-exchanged water and 300 g of polyvinyl alcohol with an average polymerization degree of 3000 and a saponification degree of 88.2% by mole were placed, and the contents were heated and dissolved with stirring to obtain a solution. Next, to this solution, 47.3 g of 60% by weight, nitric acid as a catalyst was added, the temperature was adjusted to 10° C., and then, 187.1 g of n-butyraldehyde was added with stirring, whereupon a polyvinyl butyral resin in a white particulate form precipitated. At 20 minutes after the precipitation, 144 g of 60% by weight nitric acid was added, and the contents were heated to 55° C. and aged for 2 hours at 57.5° C. Then, the solution was cooled and neutralized, after which the polyvinyl butyral resin was washed with water and dried to obtain Polyvinyl acetal resin Y.

SYNTHESIS EXAMPLE 7

Synthesis of Polyvinyl Acetal Resin Z:

In a reactor equipped with a stirring apparatus, 3299 ml of ion-exchanged water and 300 g of polyvinyl alcohol with an average polymerization degree of 3000 and a saponification degree of 88.2% by mole were placed, and the contents were heated and dissolved with stirring to obtain a solution. Next, to this solution, 47.3 g of 60% by weight nitric acid as a catalyst was added, the temperature was adjusted to 10° C., and then, 171.3 g of n-butyraldehyde was added with stirring, whereupon a polyvinyl butyral resin in a white particulate form precipitated. At 20 minutes after the precipitation, 144 g of 60% by weight nitric acid was added, and the contents were heated to 55° C. and aged for 2 hours at 57.5° C. Then, the solution was cooled and neutralized, after which the polyvinyl butyral resin was washed with water and dried to obtain Polyvinyl acetal resin z.

SYNTHESIS EXAMPLE 8

Synthesis of Polyvinyl Acetal Resin E (PVB Resin):

In a reactor equipped with a stirring apparatus, 2700 ml of ion-exchanged water and 300 g of polyvinyl alcohol with an average polymerization degree of 1700 and a saponification degree of 99.0% by mole were placed, and the contents were heated and dissolved with stirring to obtain a solution. Next, to this solution, 21 g of 35.5% by weight hydrochloric acid as a catalyst was added, the temperature was adjusted to 14° C., and then, 155 g of n-butyraldehyde was added with stirring, whereupon a polyvinyl butyral resin in a white particulate form precipitated. At 20 minutes after the precipitation, 172 g of 35.5% by weight hydrochloric acid was added, and the contents were heated to 60° C. and aged for 2 hours at 66° C. Then, the solution was cooled and neutralized, after which the polyvinyl butyral resin was washed with water and dried to obtain Polyvinyl acetal resin E.

SYNTHESIS EXAMPLE 9

Synthesis of Polyvinyl Acetal Resin F (PVB resin):

In a reactor equipped with a stirring apparatus, 2700 ml of ion-exchanged water and 300 g of polyvinyl alcohol with an average polymerization degree of 1700 and a saponification degree of 99.0% by mole were placed, and the contents were heated and dissolved with stirring to obtain a solution. Next, to this solution, 21 g of 35.5% by weight hydrochloric acid as a catalyst was added, the temperature was adjusted to 14° C., and then, 160 g of n-butyraldehyde was added with stirring, whereupon a polyvinyl butyral resin in a white particulate form precipitated. At 20 minutes after the precipitation, 172 g of 35.5% by weight hydrochloric acid was added, and the contents were heated to 57° C. and aged for 2 hours at 63° C. Then, the solution was cooled and neutralized, after which the polyvinyl butyral resin was washed with water and dried to obtain Polyvinyl acetal resin F.

SYNTHESIS EXAMPLE 10

Synthesis of Polyvinyl Acetal Resin G (PVB Resin):

In a reactor equipped with a stirring apparatus, 2700 ml of ion-exchanged water and 300 g of polyvinyl alcohol with an average polymerization degree of 1700 and a saponification degree of 99.0% by mole were placed, and the contents were heated and dissolved with stirring to obtain a solution. Next, to this solution, 21 g of 35.5% by weight hydrochloric acid as a catalyst was added, the temperature was adjusted to 14° C., and then, 160 g of n-butyraldehyde was added with stirring, whereupon a polyvinyl butyral resin in a white particulate form precipitated. At 20 minutes after the precipitation, 172 g of 35.5% by weight hydrochloric acid was added, and the contents were heated to 40° C. and aged for 3 hours at 46° C. Then, the solution was cooled and neutralized, after which the polyvinyl butyral resin was washed with water and dried to obtain Polyvinyl acetal resin G.

SYNTHESIS EXAMPLE 11

Synthesis of Polyvinyl Acetal Resin V (PVB Resin):

In a reactor equipped with a stirring apparatus, 3244 ml of ion-exchanged water and 300 g of polyvinyl alcohol with an average polymerization degree of 3000 and a saponification degree of 88.2% by mole were placed, and the contents were heated and dissolved with stirring to obtain a solution. Next, to this solution, 47.3 g of 60% by weight nitric acid as a catalyst was added, the temperature was adjusted to 10° C., and then, 199 g of n-butyraldehyde was added with stirring, whereupon a polyvinyl butyral resin in a white particulate form precipitated. At 20 minutes after the precipitation, 144 g of 60% by weight nitric acid was added, and the contents were heated to 65° C. and aged for 2 hours at 67.5° C. Then, the solution was cooled and neutralized, after which the polyvinyl butyral resin was washed with water and dried to obtain Polyvinyl acetal resin V.

(Plasticizer)
Triethylene glycol di-2-ethylhexanoate (3GO)
(Ultraviolet Ray Shielding Agent)
Tinuvin 326 (2-(2'-hydroxy-3'-t-butyl-5-methylphenyl)-5-chlorobenzotriazole, "Tinuvin 326" available from BASF Japan Ltd.)
(Oxidation Inhibitor)
BHT (2,6-di-t-butyl-p-cresol)

EXAMPLE 1

Preparation of Composition for Forming First Layer:

One hundred parts by weight of a polyvinyl acetal resin (Polyvinyl acetal resin A), 30 parts by weight of a plasticizer (3GO), 0.2 part by weight of an ultraviolet ray shielding agent (Tinuvin 326) and 0.2 part by weight of an oxidation inhibitor (BHT) were mixed to obtain a composition for forming a first layer.

Preparation of Interlayer Film;

By allowing the composition for forming a first layer to be extruded using an extruder, a single-layered interlayer film (760 μm in thickness) composed only of a first layer (760 μm in thickness) was prepared.

Preparation of Laminated Glass A:

Two washed and dried glass plates (clear float, glass, 25 cm in longitudinal length by 10 cm in transversal length by 2.5 mm in thickness) were prepared. The obtained inter layer film was sandwiched between the two glass plates to obtain a laminate. The obtained laminate was put into a rubber bag and the inside thereof was degassed for 20 minutes at a degree of vacuum of 2660 Pa (20 torr). Afterward, while being degassed, furthermore, the laminate was held in place for 30 minutes at 90° C. and pressed under vacuum in an autoclave. The laminate thus preliminarily press-bonded was subjected to press-bonding for 20 minutes under conditions of 135° C. and a pressure of 1.2 MPa (12 kg/cm$^2$) in an autoclave to obtain a sheet of laminated glass.

Preparation of Laminated Glass B:

One washed and dried glass plate (clear float glass, 25 cm in longitudinal length by 10 cm in transversal length by 2.5 mm in thickness) was prepared. One washed and dried glass plate (Gorilla glass, 25 cm in longitudinal length by 10 cm in transversal length by 0.7 mm in thickness) was prepared. Laminated glass B was obtained in the same manner as that for the Laminated glass A except that these two glass plates were used.

Preparation of Laminated Glass C:

Two washed find dried glass plates (Gorilla glass, 25 cm in longitudinal length by 10 cm in transversal length by 0.7 mm in thickness) were prepared. Laminated glass C was obtained in the same manner as that for the Laminated glass A except that these two glass plates were used.

EXAMPLES 2 TO 11 AND COMPARATIVE EXAMPLES 1, 2

An interlayer film, Laminated glass A, Laminated glass B and Laminated glass C were obtained in the same manner as that in Example 1 except that the kinds of the polyvinyl acetal resin and the plasticizer used for a composition for forming the first layer, the amount of the plasticizer blended relative to 100 parts by weight of the polyvinyl acetal resin, and the thickness of the first layer were set to those listed in the following Table 1.

EXAMPLE 12

Preparation of Composition for Forming First Layer and Third Layer:

One hundred parts by weight of a polyvinyl acetal resin (Polyvinyl acetal resin A), 31.5 parts by weight, of a plasticizer (3GO), 0.2 part by weight of an ultraviolet ray shielding agent (Tinuvin 326) and 0.2 part by weight of an oxidation inhibitor (BHT) were mixed to obtain a composition X for forming a first layer and a third layer.

Preparation of Composition for Forming Second Layer:

One hundred parts by weight of a polyvinyl acetal resin (Polyvinyl acetal resin X), 60 parts by weight of a plasticizer (3GO), 0.2 part by weight of an ultraviolet ray shielding agent (Tinuvin 326) and 0.2 part by weight of an oxidation inhibitor (BHT) were mixed to obtain a composition for forming a second layer.

Preparation of Interlayer Film:

By allowing the composition for forming a first layer and a third layer and the composition for forming a second layer to be coextruded using a coextruder, a multi-layered interlayer film (760 μm in thickness) having a structure with a stack of a first layer (330 μm in thickness)/a second layer (100 μm in thickness)/a third layer (330 μm in thickness) was prepared.

Preparation of Laminated Glass:

Laminated glass A, Laminated glass B and Laminated glass C were obtained in the same manner as that in Example 1 except that the obtained interlayer film was used.

Preparation of Laminated Glass for Sound Insulating Properties Measurement:

Two washed and dried glass plates (clear float glass, 30 cm in longitudinal length by 2.5 cm in transversal length by 2.5 mm in thickness) were prepared. The obtained interlayer film was sandwiched between the two glass plates to obtain a laminate. The obtained laminate was put into a rubber bag and the inside thereof was degassed for 20 minutes at a degree of vacuum of 2660 Pa (20 torr). Afterward, while being degassed, furthermore, the laminate was held in place for 30 minutes at 90° C. and pressed under vacuum in an autoclave. The laminate thus preliminarily press-bonded was subjected to press-bonding for 20 minutes under conditions of 135° C. and a pressure of 1.2 MPa (12 kg/cm$^2$) in an autoclave to obtain a sheet of laminated glass for sound insulating properties measurement.

EXAMPLES 13 TO 27

An interlayer film, Laminated glass A, Laminated glass B and Laminated glass C were obtained in the same manner as that in Example 12 except that the kinds of the polyvinyl acetal resin and the plasticizer used for a composition for forming the first layer, the second layer and the third layer, the amount of the plasticizer blended relative to 100 parts by weight of the polyvinyl acetal resin, and the thicknesses of the first layer, the second layer and the third layer were set to those listed in the following Tables 2 and 3.

COMPARATIVE EXAMPLES 3, 4

An interlayer film, Laminated glass A, Laminated glass B and Laminated glass C were obtained in the same manner as that in Example 12 except that the kinds of the polyvinyl acetal resin and the plasticizer used for a composition for forming the first layer, the second layer and the third layer, the amount of the plasticizer blended relative to 100 parts by weight of the polyvinyl acetal resin, and the thicknesses of the first layer, the second layer and the third layer were set to those listed in the following Tables 2 and 3.

(Evaluation)

(1) Half-Value Width

A polyvinyl acetal resin was measured for the half-value width in the following manner.

Preparation Method of Film for Infrared Absorption Spectrum Measurement:

In 9.5 g of a mixed solvent of methanol and butanol (volume mixing ratio of 1:1), 0.5 g of a polyvinyl acetal resin was dissolved to obtain a solution. An aluminum plate (15 cm in longitudinal length by 5 cm in transversal length by 1 mm in thickness) was covered with a polyethylene film to prepare a substrate for preparing a film. The solution was dropped and applied onto the substrate for preparing a film so as to spread over the whole face thereof. The substrate was allowed to vertically stand and the excessive solution was recovered. This substrate was dried for 15 minutes in an infrared dryer (available from SHIMIZU SCIENTIFIC INSTRUMENTS MFC Co., Ltd.). Afterward, the substrate was taken out thereof and horizontally held in place, and the solution was dropped and applied onto the substrate so as to spread over the lower half part (7.5 cm in longitudinal length by 5 cm in transversal length) of the substrate in the upper and lower position relation established when allowed to vertically stand. The substrate was allowed to vertically stand and the excessive solution was recovered. The substrate was again dried for 1 hour in an infrared drying machine. Afterward, the substrate was dried under vacuum for 4 hours at 60° C. in a rectangular vacuum constant-temperature dryer ("DP33" available from Yamato Scientific Co., Ltd., vacuum pump: "MINIVAC PD-102" available from Yamato Scientific Co., Ltd.). With regard to a sample dried, the sample was transferred into a desiccator immediately after taken out of the vacuum constant-temperature dryer and allowed to cool for 30 minutes to obtain a substrate with a film.

In this connection, in order to evaluate a polyvinyl acetal resin in an interlayer film for the half-value width, it is necessary to isolate the polyvinyl acetal resin by a reprecipitation method. First, 2 g of an interlayer film (in the case of a multilayeredly constituted one, a layer to be analyzed is peeled off and the isolated layer is used) is dissolved in 40 g of tetrahydrofuran (THF) which is a good solvent to obtain a THF solution. In a 1-L beaker, 600 g of n-hexane is placed, and to this, the above-mentioned THF solution is added drop by drop while the contents are stirred with a magnetic stirrer. After the completion of dropping the whole quantity, only lumps of a resin which precipitated at the bottom of the beaker are taken out with tweezers and broken into pieces in a petri dish to completely remove the organic solvent using an infrared drying machine and a vacuum drying machine. Using 0.5 g of the resin thus obtained, a film for the infrared absorption spectrum measurement is prepared in the same manner as that described in the preceding paragraph.

Infrared absorption spectrum measurement method:

For the measurement, the Fourier transformation infrared spectrophotometer IR-720 available from HORIBA, Ltd. was used. As the software, "HORIBA FT-IR for Windows (registered trademark) version 4.06" was used. For the purpose of preventing the influence of the moisture absorption of a sample and the humidity itself on the measurement result, the environment in a room where the measurement is performed was always kept at the temperature: 23±2° C. and the humidity: RH25±5%, and the time required for taking a substrate with a film out of the desiccator and completing one measurement operation was set within 5 minutes.

The measurement procedure is as follows. A substrate was taken out of the desiccator, and only a film was cut away with a utility knife and set to a sample holder. The measurement was repeatedly performed at a test, mode and the position of the film was adjusted so that the transmittance of a peak appearing at about 2950 cm$^{-1}$ lies within the range of 20±0.5%. After the adjustment, the measurement was started.

The measurement conditions are as follows. The number of times of scanning: 5, the instrumental function: H-G, the scanning speed: 12.5, the resolution: 2, the gain: 1, the measurement range: 400 to 4000, and the spectrum: % T.

After the completion of the measurement, smoothing was performed. The smoothing was carried out under the condition of the intensity: 13 and the set range: the maximum value of 4000, the minimum value of 400. After the completion of smoothing, a peak appearing at about 3500 cm$^{-1}$ and a peak appearing at about 2950 cm$^{-1}$ were subjected to a baseline correction. A baseline was drawn between a point, which is a root part at the high wavenumber side of a peak at about 3500 cm$^{-1}$ (a peak derived from the hydroxyl group), where the transmittance is heightened at about 3700 cm$^{-1}$ and a point at 2500 cm$^{-1}$ for the correction. After the completion of the baseline correction, a spectrum chart on which a peak part derived from the hydroxyl group is enlarged was printed out (for example, the wavenumber range: 3100 to 3700 cm$^{-5}$, the transmittance range: 50 to 100%). The half-value width of the hydroxyl group was evaluated on the basis of the printed-out spectrum chart.

Evaluation Method for Half-Value Width of Hydroxyl Group:

The peak width at X % transmittance of a hydroxyl group peak was measured with a ruler (X=SQRT (100* transmittance of OH group peak top)). The measured length is defined as A mm. Next, the length between 3100 cm$^{-1}$ and 3600 cm$^{-1}$ in the horizontal axis was measured with a ruler. The measured length is defined as B mm. From the above results, a value calculated from 500×A/B was defined as the half-value width of the hydroxyl group.

(2) Glass Transition Temperature

Kneaded products having respective compositions of the first layer and the third layer in examples and comparative examples were prepared. The kneaded product prepared was press-molded with a press molding machine to obtain Resin film A with a thickness of 0.35 mm. The Resin film A obtained was allowed to stand for 2 hours under the condition of 25° C. and a relative humidity of 30%. After allowed to stand for 2 hours, the viscoelasticity thereof was measured by means of the "ARES-G2" available from TA Instruments Japan Inc. As a jig, a parallel plate with a diameter of 8 mm was used. The measurement was performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.).

(3) Flexural Rigidity

The obtained Laminated glass A, Laminated glass B and Laminated glass C were prepared. In each of Laminated glass A, Laminated glass B and Laminated glass C, the following glass plates are used.

Laminated glass A: two glass plates (clear float glass, 25 cm in longitudinal length by 10 cm in transversal length by 2.5 mm in thickness)

Laminated glass B: one glass plate (clear float glass, 25 cm in longitudinal length by 10 cm in transversal length by 2.5 mm in thickness) and one glass plate (Gorilla glass, 25 cm in longitudinal length by 10 cm in transversal length by 0.7 mm in thickness)

Laminated glass C: two glass plates (Gorilla glass, 25 cm in longitudinal length by 10 cm in transversal length by 0.7 mm in thickness)

The flexural rigidity was evaluated by the testing method schematically shown in FIG. 5. As a measuring apparatus, the universal testing machine 5966 which is available from INSTRON Japan Co., Ltd. and equipped with the static 3-point flexural test jig 2810 was used. Under measurement conditions of the measurement temperature of 20±3° C., the distance D1 of 18 cm and the distance D2 of 25 cm, a sheet of laminated glass was deformed in the F direction at a displacement rate of 1 mm/minute, and the stress at the time when the deformation amount becomes 1.5 mm was measured to calculate the flexural rigidity. The flexural rigidity was judged according to the following criteria.

[Criteria for Judgment in Flexural Rigidity]

1: The measured value obtained from Laminated glass C is less than 0.002 mm/N.

2: The measured value obtained from Laminated glass C is greater than or equal to 0.002 mm/N and less than 0.005 mm/N.

3: The criteria for judgment of 1 and 2 are not satisfied, and the measured value obtained from Laminated glass B is less than 0.005 mm/N.

4: The criteria for judgment of 1 to 3 are not satisfied, and the measured value obtained from Laminated glass C is less than 0.11 mm/N.

5: The criteria for judgment of 1 to 3 are not satisfied, and the measured value obtained from Laminated glass C is greater than or equal to 0.11 mm/N.

(4) Sound Insulating Properties

With regard to the sound insulating properties of laminated glass for sound insulating properties measurement obtained in Examples 12 to 27 and Comparative Examples 3, 4, the laminated glass was excited by means of a vibration generator for a damping test ("Vibration exciter G21-005D" available from SHINKEN CO., LTD.) to obtain vibration characteristics, the vibration characteristics were amplified by a mechanical impedance measuring apparatus ("XG-81" available from RION Co., Ltd.), and the vibration spectrum was analyzed by an FFT spectrum analyzer ("FFT analyzer HP3582A" available from Yokogawa Hewlett-Packard).

From the ratio of the loss factor thus obtained to the resonance frequency of laminated glass, a graph showing the relationship between the sound frequency (Hz) and the sound transmission loss (dB) at 20° C. was prepared to determine the minimum sound transmission loss (TL value) at a sound frequency of about 2,000 Hz. The higher this TL value is, the higher the sound insulating properties become. The sound insulating properties were judged according to the following criteria.

[Criteria for Judgment in Sound Insulating Properties]

Circle: The TL value is greater than or equal to 37 dB.

Triangle: The TL value is greater than or equal to 35 dB and less than 37 dB.

X mark: The TL value is less than 35 dB.

The details and the results are shown in the following Tables 1 to 3. In this connection, in the following Tables 1 to 3, the description of ingredients to be blended other than the polyvinyl acetal resin and the plasticizer was omitted.

TABLE 1

| | | | Ex. 1 | Ex. 2 | Ex. 3 | Ex. 4 | Ex. 5 | Ex. 6 | Comp. Ex 1 |
|---|---|---|---|---|---|---|---|---|---|
| First Layer | Thickness | μm | 760 | 760 | 760 | 1520 | 1520 | 1520 | 760 |
| | Polyvinyl acetal; resin | Kind | A | A | A | A | A | A | B |
| | | Average polymerization degree of PVA | 1700 | 1700 | 1700 | 1700 | 1700 | 1700 | 1700 |
| | | Content ratio of hydroxyl group (% by mole) | 34.4 | 34.4 | 34.4 | 34.4 | 34.4 | 34.4 | 30.0 |
| | | Acetylation degree (% by mole) | 0.8 | 0.8 | 0.8 | 0.8 | 0.8 | 0.8 | 0.9 |
| | | Acetalization degree (% by mole) | 64.8 | 64.8 | 64.8 | 64.8 | 64.8 | 64.8 | 69.1 |
| | | Half-value width (cm$^{-1}$) | 274.8 | 274.8 | 274.8 | 274.8 | 274.8 | 274.8 | 239.3 |
| | | Content (Parts by weight) | 100 | 100 | 100 | 100 | 100 | 100 | 100 |
| | Plasticizer | Kind | 3GO | 3GO | 3GO | 3GO | 3GO | 3GO | 3GO |
| | | Content (Parts by weight) | 30 | 20 | 15 | 30 | 20 | 15 | 40 |
| Evaluation | Glass transition temperature of first layer | ° C. | 39.6 | 47.9 | 51.6 | 39.6 | 47.9 | 51.6 | 27.8 |
| | Flexural rigidity | Laminated glass A (mm/N) | 0.0033 | 0.0012 | 0.0007 | 0.0030 | 0.0010 | 0.0002 | 0.0054 |
| | | Laminated glass B (mm/N) | 0.0072 | 0.0031 | 0.0018 | 0.0066 | 0.0028 | 0.0012 | 0.0108 |
| | | Laminated glass C (mm/N) | 0.0800 | 0.0371 | 0.0044 | 0.0600 | 0.0185 | 0.0005 | 0.1180 |
| | | Evaluation | 4 | 3 | 2 | 4 | 3 | 1 | 5 |

| | | | Ex. 7 | Ex. 8 | Comp. Ex. 2 | Ex. 9 | Ex. 10 | Ex. 11 |
|---|---|---|---|---|---|---|---|---|
| First Layer | Thickness | μm | 760 | 760 | 1520 | 1520 | 760 | 760 |
| | Polyvinyl acetal; resin | Kind | B | B | B | B | C | D |
| | | Average polymerization degree of PVA | 1700 | 1700 | 1700 | 1700 | 1700 | 1700 |
| | | Content ratio of hydroxyl group (% by mole) | 30.0 | 30.0 | 30.0 | 30.0 | 35.0 | 29.4 |
| | | Acetylation degree (% by mole) | 0.9 | 0.9 | 0.9 | 0.9 | 0.8 | .09 |
| | | Acetalization degree (% by mole) | 69.1 | 69.1 | 69.1 | 69.1 | 64.2 | 69.7 |
| | | Half-value width (cm$^{-1}$) | 239.3 | 239.3 | 239.3 | 239.3 | 251.0 | 235.6 |
| | | Content (Parts by weight) | 100 | 100 | 100 | 100 | 100 | 100 |

TABLE 1-continued

|  |  |  |  |  |  |  |  |  |
|---|---|---|---|---|---|---|---|---|
|  | Plasticizer | Kind |  | 3GO | 3GO | 3GO | 3GO | 3GO | 3GO |
|  |  | Content | Parts by weight | 20 | 12 | 40 | 20 | 30 | 29 |
| Evaluation | Glass transition temperature of first layer |  | °C. | 44.4 | 53.0 | 27.8 | 44.4 | 38.3 | 33.5 |
|  | Flexural rigidity | Laminated glass A | mm/N | 0.0012 | 0.0006 | 0.0052 | 0.0009 | 0.0019 | 0.0027 |
|  |  | Laminated glass B | mm/N | 0.0035 | 0.0017 | 0.0109 | 0.0028 | 0.0079 | 0.0081 |
|  |  | Laminated glass C | mm/N | 0.0221 | 0.0042 | 0.0922 | 0.0107 | 0.0853 | 0.0875 |
|  |  | Evaluation |  | 3 | 2 | 4 | 3 | 4 | 4 |

TABLE 2

|  |  |  |  | Ex. 12 | Ex. 13 | Ex. 14 | Ex. 15 | Ex. 16 |
|---|---|---|---|---|---|---|---|---|
| First layer Third layer | | Each Thickness | μm | 330 | 330 | 330 | 330 | 355 |
| | Polyvinyl acetal resin | Kind | — | A | E | F | G | A |
| | | Average polymerization degree of PVA | — | 1700 | 1700 | 1700 | 1700 | 1700 |
| | | Content ratio of hydroxyl group | % by mole | 34.5 | 34.8 | 33.0 | 34.9 | 34.5 |
| | | Acetylation degree | % by mole | 0.8 | 1.0 | 1.0 | 1.0 | 0.8 |
| | | Acetalization degree | % by mole | 64.8 | 64.2 | 66.0 | 64.1 | 64.8 |
| | | Half-value width | $cm^{-1}$ | 274.8 | 267.0 | 257.3 | 247.6 | 274.8 |
| | | Content | Parts by weight | 100 | 100 | 100 | 100 | 100 |
| | Plasticizer | Kind | | 3GO | 3GO | 3GO | 3GO | 3GO |
| | | Content | Parts by weight | 31.5 | 28.8 | 35.6 | 24.5 | 31.5 |
| Second layer | | Thickness | μm | 100 | 100 | 100 | 100 | 50 |
| | Polyvinyl acetal resin | Kind | | X | Y | Z | V | X |
| | | Average polymerization degree of PVA | — | 2300 | 3000 | 3000 | 3000 | 2300 |
| | | Content ratio of hydroxyl group | % by mole | 22.7 | 23.3 | 25.6 | 21.7 | 22.7 |
| | | Acetylation degree | % by mole | 12.1 | 11.8 | 11.8 | 11.8 | 12.1 |
| | | Acetalization degree | % by mole | 65.2 | 64.9 | 62.6 | 66.5 | 65.2 |
| | | Half-value width | $cm^{-1}$ | 164.9 | 165.1 | 168.4 | 160.4 | 164.9 |
| | | Content | Parts by weight | 100 | 100 | 100 | 100 | 100 |
| | Plasticizer | Kind | | 3GO | 3GO | 3GO | 3GO | 3GO |
| | | Content | Parts by weight | 60 | 75 | 75 | 75 | 60 |
| Evaluation | Glass transition temperature of first layer and third layer | | °C. | 39.0 | 33.2 | 40.1 | 43.5 | 39.0 |
| | Flexural rigidity | Laminated glass A | mm/N | 0.0041 | 0.0043 | 0.0043 | 0.0043 | 0.0043 |
| | | Laminated glass B | mm/N | 0.0080 | 0.0087 | 0.0086 | 0.0086 | 0.0073 |
| | | Laminated glass C | mm/N | 0.0602 | 0.0572 | 0.0557 | 0.0555 | 0.0386 |
| | Sound insulating properties | TL value | — | ○ | ○ | ○ | ○ | ○ |
| | | Evaluation | | 4 | 4 | 4 | 4 | 4 |

|  |  |  |  | Ex. 17 | Ex. 18 | Ex. 19 | Ex. 20 |
|---|---|---|---|---|---|---|---|
| First layer Third layer | | Each Thickness | μm | 355 | 355 | 355 | 240 |
| | Polyvinyl acetal resin | Kind | | E | F | G | A |
| | | Average polymerization degree of PVA | — | 1700 | 1700 | 1700 | 1700 |
| | | Content ratio of hydroxyl group | % by mole | 34.8 | 33.0 | 34.9 | 34.5 |
| | | Acetylation degree | % by mole | 1.0 | 1.0 | 1.0 | 0.8 |
| | | Acetalization degree | % by mole | 64.2 | 66.0 | 64.1 | 64.8 |
| | | Half-value width | $cm^{-1}$ | 267.0 | 257.3 | 247.6 | 274.8 |
| | | Content | Parts by weight | 100 | 100 | 100 | 100 |

TABLE 2-continued

|  |  |  |  |  |  |  |  |
|---|---|---|---|---|---|---|---|
|  | Plasticizer | Kind |  | 3GO | 3GO | 3GO | 3GO |
|  |  | Content | Parts by weight | 28.8 | 35.6 | 24.5 | 31.5 |
| Second layer | Thickness |  | μm | 50 | 50 | 50 | 280 |
|  | Polyvinyl acetal resin | Kind |  | Y | Z | V | X |
|  |  | Average polymerization degree of PVA | — | 3000 | 3000 | 3000 | 2300 |
|  |  | Content ratio of hydroxyl group | % by mole | 23.3 | 25.6 | 21.7 | 22.7 |
|  |  | Acetylation degree | % by mole | 11.8 | 11.8 | 11.8 | 12.1 |
|  |  | Acetalization degree | % by mole | 64.9 | 62.6 | 66.5 | 65.2 |
|  |  | Half-value width | cm$^{-1}$ | 165.1 | 168.4 | 160.4 | 164.9 |
|  |  | Content | Parts by weight | 100 | 100 | 100 | 100 |
|  | Plasticizer | Kind |  | 3GO | 3GO | 3GO | 3GO |
|  |  | Content | Parts by weight | 75 | 75 | 75 | 60 |
| Evaluation | Glass transition temperature of first layer and third layer |  | ° C. | 33.2 | 40.1 | 43.5 | 39.0 |
|  | Flexural rigidity | Laminated glass A | mm/N | 0.0036 | 0.0038 | 0.0035 | 0.0035 |
|  |  | Laminated glass B | mm/N | 0.0075 | 0.0073 | 0.0073 | 0.0110 |
|  |  | Laminated glass C | mm/N | 0.0405 | 0.0385 | 0.0381 | 0.0974 |
|  | Sound insulating properties | TL value | — | ○ | ○ | ○ | ○ |
|  |  | Evaluation |  | 4 | 4 | 4 | 4 |

TABLE 3

|  |  |  |  | Ex. 21 | Ex. 22 | Ex. 23 | Ex. 24 | Ex. 25 |
|---|---|---|---|---|---|---|---|---|
| First layer Third layer | Each Thickness |  | μm | 240 | 240 | 240 | 330 | 330 |
|  | Polyvinyl acetal resin | Kind |  | E | F | G | A | E |
|  |  | Average polymerization degree of PVA | — | 1700 | 1700 | 1700 | 1700 | 1700 |
|  |  | Content ratio of hydroxyl group | % by mole | 34.8 | 33.0 | 34.9 | 34.5 | 34.8 |
|  |  | Acetylation degree | % by mole | 1.0 | 1.0 | 1.0 | 0.8 | 1.0 |
|  |  | Acetalization degree | % by mole | 64.2 | 66.0 | 64.1 | 64.8 | 64.2 |
|  |  | Half-value width | cm$^{-1}$ | 267.0 | 257.3 | 247.6 | 274.8 | 267.0 |
|  |  | Content | Parts by weight | 100 | 100 | 100 | 100 | 100 |
|  | Plasticizer | Kind |  | 3GO | 3GO | 3GO | 3GO | 3GO |
|  |  | Content | Parts by weight | 28.8 | 35.6 | 24.5 | 31.5 | 28.8 |
| Second layer | Thickness |  | μm | 280 | 280 | 280 | 100 | 100 |
|  | Polyvinyl acetal resin | Kind |  | Y | Z | V | X | Y |
|  |  | Average polymerization degree of PVA | — | 3000 | 3000 | 3000 | 2300 | 3000 |
|  |  | Content ratio of hydroxyl group | % by mole | 23.3 | 25.6 | 21.7 | 22.7 | 22.3 |
|  |  | Acetylation degree | % by mole | 11.8 | 11.8 | 11.8 | 12.1 | 11.8 |
|  |  | Acetalization degree | % by mole | 64.9 | 62.6 | 66.5 | 65.2 | 64.9 |
|  |  | Half-value width | cm$^{-1}$ | 165.1 | 168.4 | 160.4 | 164.9 | 165.1 |
|  |  | Content | Parts by weight | 100 | 100 | 100 | 100 | 100 |
|  | Plasticizer | Kind |  | 3GO | 3GO | 3GO | 3GO | 3GO |
|  |  | Content | Parts by weight | 75 | 75 | 75 | 50 | 50 |
| Evaluation | Glass transition temperature of first layer and third layer |  | ° C. | 33.2 | 40.1 | 43.5 | 39.0 | 33.2 |
|  | Flexural rigidity | Laminated glass A | mm/N | 0.0057 | 0.0057 | 0.0057 | 0.0057 | 0.0040 |
|  |  | Laminated glass B | mm/N | 0.0110 | 0.0110 | 0.0110 | 0.0081 | 0.0082 |
|  |  | Laminated glass C | mm/N | 0.0980 | 0.0974 | 0.0973 | 0.0480 | 0.0480 |
|  | Sound insulating properties | TL value | — | ○ | ○ | ○ | Δ | Δ |
|  |  | Evaluation |  | 4 | 4 | 4 | 4 | 4 |

TABLE 3-continued

|  |  |  |  | Ex. 26 | Ex. 27 | Comp. Ex. 3 | Comp. Ex. 4 |
|---|---|---|---|---|---|---|---|
| First layer Third layer | Polyvinyl acetal resin | Each Thickness | μm | 330 | 330 | 330 | 330 |
|  |  | Kind | — | F | G | B | B |
|  |  | Average polymerization degree of PVA | — | 1700 | 1700 | 1700 | 1700 |
|  |  | Content ratio of hydroxyl group | % by mole | 33.0 | 34.9 | 30.0 | 30.0 |
|  |  | Acetylation degree | % by mole | 1.0 | 1.0 | 0.9 | 0.9 |
|  |  | Acetalization degree | % by mole | 66.0 | 64.1 | 69.1 | 69.1 |
|  |  | Half-value width | cm$^{-1}$ | 257.3 | 247.6 | 239.3 | 239.3 |
|  |  | Content | Parts by weight | 100 | 100 | 100 | 100 |
|  | Plasticizer | Kind |  | 3GO | 3GO | 3GO | 3GO |
|  |  | Content | Parts by weight | 35.6 | 24.5 | 26.5 | 38.5 |
| Second layer | Polyvinyl acetal resin | Thickness | μm | 100 | 100 | 100 | 100 |
|  |  | Kind |  | Z | V | X | X |
|  |  | Average polymerization degree of PVA | — | 3000 | 3000 | 2300 | 2300 |
|  |  | Content ratio of hydroxyl group | % by mole | 25.6 | 21.7 | 22.7 | 22.7 |
|  |  | Acetylation degree | % by mole | 11.8 | 11.8 | 12.1 | 12.1 |
|  |  | Acetalization degree | % by mole | 62.6 | 66.5 | 65.2 | 65.2 |
|  |  | Half-value width | cm$^{-1}$ | 168.4 | 160.4 | 164.9 | 164.9 |
|  |  | Content | Parts by weight | 100 | 100 | 100 | 100 |
|  | Plasticizer | Kind |  | 3GO | 3GO | 3GO | 3GO |
|  |  | Content | Parts | 50 | 50 | 75 | 60 |
| Evaluation | Glass transition temperature of first layer and third layer |  | °C. | 40.1 | 43.5 | 30.2 | 28.4 |
|  | Flexural rigidity | Laminated glass A | mm/N | 0.0040 | 0.0040 | 0.0052 | 0.0053 |
|  |  | Laminated glass B | mm/N | 0.0081 | 0.0080 | 0.0113 | 0.0113 |
|  |  | Laminated glass C | mm/N | 0.0479 | 0.0477 | 0.1122 | 0.1135 |
|  | Sound insulating properties | TL value | — | Δ | Δ | ○ | ○ |
|  | Evaluation |  |  | 4 | 4 | 5 | 5 |

EXPLANATION OF SYMBOLS

1: First layer
1a: Outer surface
2: Second layer
2a: First surface
2b: Second surface
3: Third layer
3a: Outer surface
11: Interlayer film
11A: Interlayer film (First layer)
11a: First surface
11b: Second surface
21: First glass plate
22: Second glass plate
31: Laminated glass
31A: Laminated glass

The invention claimed is:

1. An interlayer film for laminated glass comprising:
a first layer containing a polyvinyl acetal resin and a plasticizer;
a second layer containing a polyvinyl acetal resin and a plasticizer; and
a third layer containing a polyvinyl acetal resin and a plasticizer,
the first layer being arranged on a first surface side of the second layer, and the third layer being arranged on a second surface side opposite to the first surface side of the second layer,
the half-value width of the hydroxyl group of the polyvinyl acetal resin contained in the first layer being less than or equal to 250 cm$^{-1}$ and the content of the plasticizer contained in the first layer relative to 100 parts by weight of the polyvinyl acetal resin contained in the first layer being greater than or equal to 5 parts by weight and less than or equal to 28 parts by weight,
the half-value width of the hydroxyl group of the polyvinyl acetal resin contained in the third layer being less than or equal to 250 cm$^{-1}$ and the content of the plasticizer contained in the third layer relative to 100 parts by weight of the polyvinyl acetal resin contained in the third layer being greater than or equal to 5 parts by weight and less than or equal to 28 parts by weight, and
the content of the plasticizer contained in the second layer relative to 100 parts by weight of the polyvinyl acetal resin contained in the second layer being greater than 50 parts by weight.

2. The interlayer film for laminated glass according to claim 1, wherein the first layer is a surface layer of the interlayer film.

3. The interlayer film for laminated glass according to claim 1, wherein the third layer is a surface layer of the interlayer film.

4. The interlayer film for laminated glass according to claim 1, wherein the content of the plasticizer contained in the second layer is greater than or equal to 55 parts by weight relative to 100 parts by weight of the polyvinyl acetal resin contained in the second layer.

5. The interlayer film for laminated glass according to claim 1, wherein the thickness of the second layer is greater than or equal to 0.0625T and less than or equal to 0.375T when the thickness of the interlayer film for laminated glass is defined as T.

6. The interlayer film for laminated glass according to claim 1, being used with a first glass plate with a thickness less than or equal to 1 mm and arranged between the first glass plate and a second glass plate to be used for obtaining laminated glass.

7. The interlayer film for laminated glass according to claim 6, being used with a first glass plate with a thickness less than or equal to 1 mm and a second glass plate with a thickness less than or equal to 1 mm and arranged between the first glass plate and the second glass plate to be used for obtaining laminated glass.

8. A laminated glass, comprising:
a first glass plate;
a second glass plate; and
an interlayer film for laminated glass according to claim 1,
wherein the interlayer film for laminated glass is arranged between the first glass plate and the second glass plate.

9. The laminated glass according to claim 8, wherein the thickness of the first glass plate is less than or equal to 1 mm.

10. The laminated glass according to claim 9, wherein the thickness of the second glass plate is less than or equal to 1 mm.

11. The interlayer film for laminated glass according to claim 1, wherein the first layer further comprises at least one selected from the group consisting of a phthalocyanine compound, a naphthalocyanine compound, and an anthracyanine compound.

12. The interlayer film for laminated glass according to claim 1, wherein the first layer further comprises tungsten oxide particles represented by the following formula (X2):

$$M_xW_yO_z \quad \text{Formula (X2)}$$

wherein
M represents at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re,
W represents tungsten,
O represents oxygen, and
x, y, and z satisfy the relations of $0.001 \geq x/y \leq 1$ and $2.0 < z/y \geq 3.0$.

13. The interlayer film for laminated glass according to claim 1, further comprising at least one of a benzotriazole-based ultraviolet ray shielding agent, a benzophenone-based ultraviolet ray shielding agent, a triazine-based ultraviolet ray shielding agent, and a benzoate-based ultraviolet ray shielding agent.

14. The interlayer film for laminated glass according to claim 1, further comprising at least one of platinum particles and palladium particles.

15. The interlayer film for laminated glass according to claim 1, wherein the content of the plasticizer contained in the first layer relative to 100 parts by weight of the polyvinyl acetal resin contained in the first layer is greater than or equal to 5 parts by weight and less than or equal to 26 parts by weight, and
the content of the plasticizer contained in the third layer relative to 100 parts by weight of the polyvinyl acetal resin contained in the third layer is greater than or equal to 5 parts by weight and less than or equal to 26 parts by weight.

16. The interlayer film for laminated glass according to claim 1, wherein the content of the plasticizer contained in the first layer relative to 100 parts by weight of the polyvinyl acetal resin contained in the first layer is greater than or equal to 5 parts by weight and less than or equal to 24.5 parts by weight, and
the content of the plasticizer contained in the third layer relative to 100 parts by weight of the polyvinyl acetal resin contained in the third layer is greater than or equal to 5 parts by weight and less than or equal to 24.5 parts by weight.

17. The interlayer film for laminated glass according to claim 1, wherein the thickness of the interlayer film is less than or equal to 760 μm.

18. The interlayer film for laminated glass according to claim 1, wherein the glass transition temperature of the second layer is lower than the glass transition temperature of the first layer,
the glass transition temperature of the second layer is lower than the glass transition temperature of the third layer, and
the thickness of the second layer is greater than or equal to 0.0625T and less than or equal to 0.375T when the thickness of the interlayer film for laminated glass is defined as T.

19. The interlayer film for laminated glass according to claim 1, wherein the half-value width of the hydroxyl group of the polyvinyl acetal resin contained in the first layer is less than or equal to 247.6 cm$^{-1}$, the acetalization degree of the polyvinyl acetal resin in the first layer is less than or equal to 64.1% by mole and the content of the plasticizer contained in the first layer relative to 100 parts by weight of the polyvinyl acetal resin contained in the first layer is greater than or equal to 5 parts by weight and less than or equal to 24.5 parts by weight,
the half-value width of the hydroxyl group of the polyvinyl acetal resin contained in the third layer is less than or equal to 247.6 cm$^{-1}$, the acetalization degree of the polyvinyl acetal resin in the third layer is less than or equal to 64.1% by mole and the content of the plasticizer contained in the third layer relative to 100 parts by weight of the polyvinyl acetal resin contained in the third layer is greater than or equal to 5 parts by weight and less than or equal to 24.5 parts by weight,
the thickness of the interlayer film is less than or equal to 760 μm,
the glass transition temperature of the second layer is lower than the glass transition temperature of the first layer,
the glass transition temperature of the second layer is lower than the glass transition temperature of the third layer, and
the thickness of the second layer is greater than or equal to 0.0625T and less than or equal to 0.375T when the thickness of the interlayer film for laminated glass is defined as T.

* * * * *